United States Patent [19]
Carey et al.

[11] Patent Number: 5,407,129
[45] Date of Patent: Apr. 18, 1995

[54] POULTRY ENVIRONMENTAL CONTROL SYSTEMS AND METHODS

[75] Inventors: Richard A. Carey, Stone Mountain; Marlon M. Moses, Norcross; Wayne D. R. Daley, Stone Mountain, all of Ga.

[73] Assignee: Georgia Tech Research Corporation, Atlanta, Ga.

[21] Appl. No.: 113,851

[22] Filed: Aug. 30, 1993

[51] Int. Cl.$^6$ .................. F24F 7/00; A01K 1/00
[52] U.S. Cl. .................. 236/91 E; 236/44 C; 236/49.3; 165/16; 374/115; 364/557
[58] Field of Search .................. 236/91 E, 49.3, 44 R, 236/44 A, 44 C, 44 E, 94, 6; 165/11.1, 12, 16, 20, 21; 237/2 R, 2 A, 3; 454/256, 258; 340/602, 584, 587; 374/110, 111, 115; 364/557; 62/126, 129, 127, 131

[56] References Cited

U.S. PATENT DOCUMENTS

| | | | |
|---|---|---|---|
| Re. 33,600 | 6/1991 | Timmons | 236/49.3 |
| 4,092,635 | 5/1978 | Warner | 340/602 X |
| 4,381,549 | 4/1983 | Stamp, Jr. et al. | 62/126 |
| 4,497,031 | 1/1985 | Froehling et al. | 364/505 |
| 4,700,887 | 10/1987 | Timmons | 236/49 |
| 4,742,475 | 5/1988 | Kaiser et al. | 364/550 |
| 4,773,471 | 9/1988 | Grant et al. | 165/3 |
| 4,858,377 | 8/1989 | Oglevee et al. | 47/17 |
| 5,036,797 | 8/1991 | Koozer | 119/21 |
| 5,082,173 | 1/1992 | Poehlman et al. | 119/21 |
| 5,103,391 | 4/1992 | Barrett | 364/133 |
| 5,115,643 | 5/1992 | Hayata et al. | 236/94 X |

OTHER PUBLICATIONS

"Computer Control for Poultry Houses," Poultry Enginering Research Review, Georgia Tech Research Institute, 1989.
W. D. R. Daley, et al., "Construction Design, and Installation of a Computerized Control System for Livestock Housing-A Case Study," Apr. 1988, pp. 255–263.
W. D. Daley, et al., "Computerized Broiler House Monitoring and Control," Agri-Mation 2, Mar. 1986, pp. 1–8.

Primary Examiner—Harry B. Tanner
Attorney, Agent, or Firm—Hopkins & Thomas

[57] ABSTRACT

A poultry house controller (14) situated within a poultry house (12) regulates the relative humidity and temperature within the poultry house (12) via actuation of fans (22) and heaters (24) in response to temperature and humidity feedback signals from temperature sensors (16) and humidity sensors (18), respectively. The controller (14) can communicate with a host computer (16) and other controllers (14) situated at other houses (12). The controller (14) comprises an integrity check means (234) for checking temperature and humidity values detected by these sensors (16, 18). The integrity check means (234) ensures the accuracy of values by eliminating a value from consideration if it falls outside predefined range of the average of the other values received from other sensors. Additionally, the controller (14) utilizes watchdog timing signals (100) for ensuring continuous operation. The watchdog timing signals (100) are generated by a control program (108) and are sent to an alarm system (92). An alarm horn (94) is sounded upon failure to receive a watchdog timing signal (100) within a predefined time period. Finally, the controller (14) optimally controls the fans (22) for ventilation and for modifying temperature by decreasing the predefined time period pertaining to the fan dedicated to minimum ventilation requirements by a time amount corresponding to actuation of another fan within the predefined time interval.

25 Claims, 25 Drawing Sheets

POULTRY ENVIRONMENTAL CONTROL SYSTEMS AND METHODS

FIELD OF INVENTION

The present invention generally relates to control systems for the environment within animal growth houses, and more particularly, to poultry environmental control systems and methods for accurately controlling the humidity and temperature within poultry growth houses.

BACKGROUND OF INVENTION

The production of broilers in the poultry industry involves a "grow out" stage in which many thousands of young chicks are delivered to a poultry house, where they are sheltered and provided with food and water through a growth cycle of about 6–8 weeks. The chicks are not individually caged, but are amassed in the poultry house by the thousands. The poultry house may be provided with large openings along its length for ventilation, the openings being provided with curtains to control air in-flow and to maintain heat in the winter. Alternatively, the building may be totally enclosed and dependant upon mechanical ventilation for substantially all air exchange, in which case fans may be located at spaced positions along the length of the house. A plurality of the heaters are also normally provided for maintaining the temperature at a desire level. The heaters may be spaced along the length of one wall, preferably the wall opposite the location of the fans. Moreover, cooling is not usually provided.

For the first three weeks of life, chicks are not able to control their own body temperature, and thus, are very susceptible to changes in temperature within the poultry house. For this reason, the heaters are capable of maintaining the temperature level constantly high in the range of 85°–95° F. Supplemental heat from these heaters must be added during cooler weather, and during warmer weather, the houses must be well ventilated to prevent over heating.

In the poultry house, the entire floor normally is covered with a "litter" material, usually wood shavings, which remains in place for about a year before being changed. During that time, the litter accumulates a great deal of fecal matter, water, spilled feed, and the like, so that its nature and consistency gradually changes over that period of time. The condition of the litter directly affects the quality of the air in the poultry house and, to a large extent, determines the air quality. Accordingly, an important factor in determining the moisture level in the litter is the relative humidity of air within the poultry house. Furthermore, bird health and performance are directly related to the moisture level of the litter in the poultry house.

The operations of various heaters and ventilators in poultry houses was, in the past, controlled manually by an operator who made periodic measurements for subjective assessments of litter moisture level and interior temperature levels, with the operator being required to then experiment with the heating and ventilation controls and attempt to regulate the air quality on the basis of those measurements or assessments. Because the relationships are complex and because the operator only makes periodic measurements and adjustments, such manual systems lead to wide, often harmful, fluctuations in temperature and humidity. This predicament presents an almost insurmountable problem even to experienced operators, particularly during periods of extremely variable weather as often occurs in the spring and the fall seasons.

Recently, attempts have been made to provide computerized control of the environment in poultry houses. For instance, U.S. Pat. No. Re. 33,600 to Timmons and U.S. Pat. No. 4,700,887 to Timmons disclose a computerized control system for a poultry house. Although in general computerized control systems for poultry houses have some merit, these systems are still in a stage of infancy and experimentation. Accurately controlling the temperature within poultry houses with these computerized control systems still presents many problems. For instance, because of the harsh environment, which includes extremely corrosive ammonia, sensors often fail and provide inaccurate temperature/humidity feedback signals to the computerized control systems. Also, the computerized control system and/or subsystems thereof typically fail because of the harsh environment without sufficient warning for remedial action to prevent extreme fluctuations in temperature/humidity, thereby adversely affecting the animals.

Still another problem with the prior art involves controlling ventilation and, specifically, the blowers. The blowers must be controlled to provide minimum ventilation requirements as a result of ammonia levels as well to modify the temperature/humidity in the poultry house, when necessary, in order to maintain an appropriate temperature/humidity for the animals. However, oftentimes, because of these dual responsibilities, the blowers are actuated too often or too little, thereby causing a drastic change in the temperature/humidity in the house.

Thus, a heretofore unaddressed need exists in the industry for systems and methods for insuring the integrity of sensed feedback signals which are representative of environmental conditions, such as temperature and humidity, within a poultry house and for optimally controlling the blowers within the poultry house to achieve both minimum ventilation requirements and a modification in temperature/humidity, when necessary.

SUMMARY OF THE INVENTION

An object of the present invention is to provide a system and method for accurately controlling the environment in an enclosure for poultry by insuring the integrity of sensed feedback signals representative of environmental conditions, including temperature and humidity, within the enclosure.

Another object of the present invention is to provide a system and method for accurately controlling the environment in a poultry enclosure by ensuring continuous operation of the monitoring and control systems associated therewith.

Another object of the present invention is to provide a system and method for optimally controlling the ventilation and fans in a poultry enclosure in order to meet minimum ventilation requirements while providing accurate modification of temperature/humidity in the enclosure with the fans, when necessary.

Briefly described, the system has one or more heaters and fans disposed in the enclosure for regulating the temperature, humidity, and ammonia levels therein. At least three temperature sensors and at least three humidity sensors are situated in a spaced relationship within the enclosure and generate respective temperature and humidity feedback signals indicative of the current temperature and current humidity around such sensors. Further, a control means controls both the heaters and fans in response to the temperature feedback signals and the humidity feedback signals. Significantly, the control means comprises a temperature integrity check means and a humidity integrity check means for insuring the accuracy of temperature feedback signals and humidity feedback signals, respectively. In essence, the temperature/humidity integrity check means eliminates a temperature/humidity feedback signal from consideration when a global temperature/humidity of the enclosure is determined, if the temperature/humidity feedback signal falls outside of a predefined range of the average of the other temperature/humidity feedback signals received from other temperature/humidity sensors. As a result of the foregoing configuration, bad or malfunctioning sensors do not adversely affect the global temperature and global relative humidity measurements within the poultry enclosure, thereby permitting more accurate control of the global temperature and global humidity.

In addition, the temperature/humidity integrity check means may comprise a means for eliminating the temperature/humidity feedback signal from consideration, if the respective signal falls outside another predefined range on an absolute scale. This feature provides a further check of integrity and can be employed prior to the check described in the previous paragraph to achieve complimentary results.

In accordance with another feature of the present invention, the system accurately controls the environment in an enclosure for poultry by ensuring continuous operation of the monitoring and control systems associated with the control means which controls the heaters and fans. The system has a program means which executes a list of instructions pertaining to the heaters and fans. The program means generates watchdog timing signals indicative of the continued operation of the program means. Importantly, an alarm means monitors the watchdog timing signals and signals an alarm upon failure to receive a watchdog timing signal within a predefined time period. Thus, if for some reason the program means ceases to operate, an alarm is signaled.

In accordance with another feature of the present invention, the system optimally controls the ventilation and fans in the poultry enclosure. The control means periodically actuates a fan for a predefined time period within a predefined time interval in order to meet minimum ventilation requirements. A ventilation control means monitors actuation of the fans. Importantly, the ventilation control means decreases the predefined time period pertaining to the fan by a time amount corresponding to actuation of another fan within the predefined time interval. In other words, if a fan has been activated in order to modify temperature/humidity within the enclosure, the amount of time necessary for proper minimum ventilation may be decreased or even eliminated, depending upon the circumstances. Thus, drastic fluctuations in temperature and/or humidity within the poultry enclosure do not occur as a result of fan control, as is the case in previous prior art embodiments.

Other objects, features, and advantages of the present invention will become apparent to one of ordinary skill in the art upon examination of the following drawings and the detail description.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENTS

Figure 1:
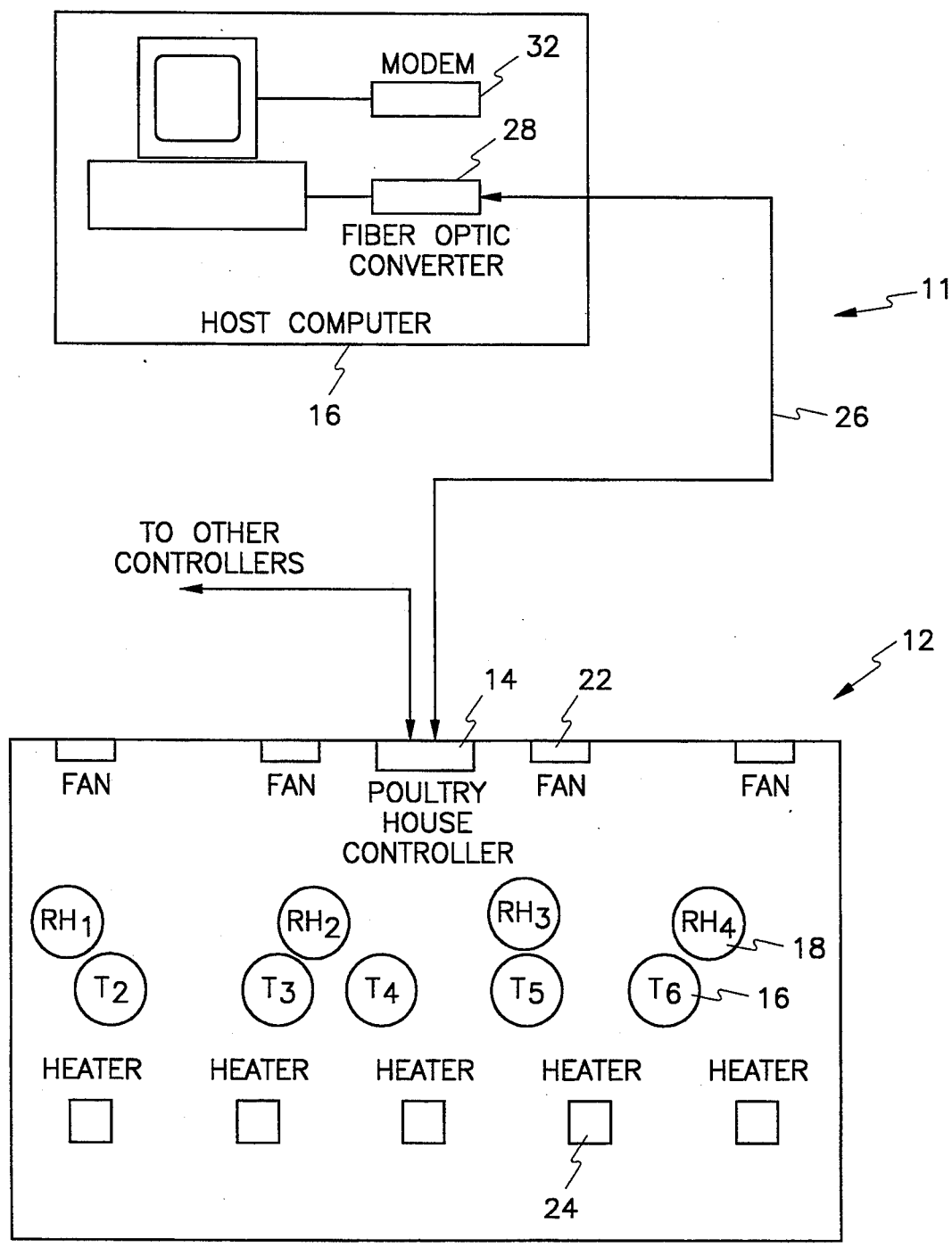
FIG. 1 is a schematic view illustrating a novel poultry house controller situated in a poultry house and which may be interfaced with a remote host computer.

With reference now to the figures wherein like reference numerals designate corresponding parts throughout the several views, FIG. 1 shows a distributed control system 11 for accurately controlling the environments within a plurality of poultry houses 12. The distributed control system 11 comprises a plurality of controllers 14 situated respectively in the plurality of poultry houses 12. The controllers 14 are preferably interfaced with a host computer 16 which is situated remotely from the poultry houses 12, perhaps in a farm house or in a management center. Each controller 14 monitors and controls the temperature and relative humidity, among other things, in its corresponding poultry house 12.

As shown in FIG. 1, the controller 14 monitors the temperature in the poultry house 12 by monitoring temperature feedback signals received from a plurality of temperature sensors $T_1$–$T_6$ denoted by reference numeral 16, which are spaced apart within the facility. The controller 14 monitors the relative humidity within the poultry house 12 by monitoring humidity feedback signals from a plurality humidity sensors $RH_1$–$RH_4$, denoted by reference numeral 18, which are spaced apart within the poultry house 12. Furthermore, the controller 14 selectively controls the temperature, relative humidity, and ammonia levels within the poultry house 12 by selectively actuating a plurality of fans 22 and heaters 24. Although not shown, the poultry house 12 may also be equipped with misters, vents, tunnel fans with controllable curtains, and other mechanisms under control of the controller 14 in order to further aid in selectively controlling the environment within the house 12.

The host computer 16 is preferably interfaced with each controller 14 via a fiber optic cable 26, which is not susceptible to adverse effects as a result of lightening or other environmental complications. A host computer program runs in the host computer 16 for displaying data to a user and allowing a user to see the current status in each of the poultry houses 12. Set points and other information may be forwarded to controller 14 via the host computer 16. Also, remote users may communicate with the host computer 16 via a modem 32.

Figure 2:
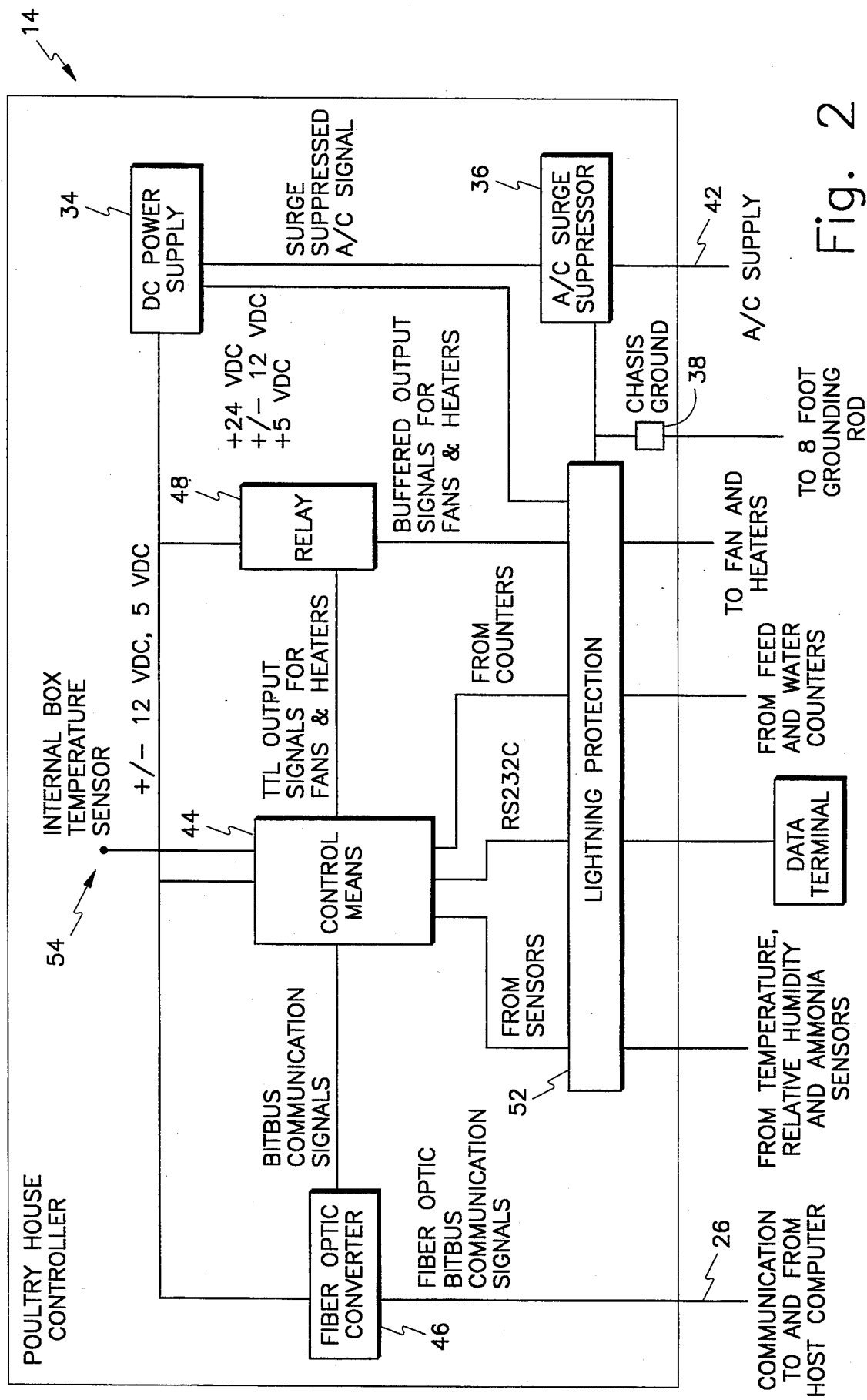
FIG. 2 is a schematic diagram illustrating the architecture of the poultry house controller of FIG. 1.

The poultry house controller 14 in FIG. 1 is shown in further detail in FIG. 2. Referring to FIG. 2, the poultry house controller 14 comprises a DC power supply 34, an AC suppressor 36 for protecting the DC power supply 34 and a chassis ground 38 from electrical surges from an AC supply line 42, a control means 44 for controlling all components and all operations within the controller 14, a fiber optic converter 46 for interfacing the fiber optic cable 26 with the control means 44, a relay mechanism 48 for buffering outputs to the fans 22 and the heaters 24, a lightening protection mechanism 52 for protecting the control means 44 from electrical surges on detection/feedback lines connected to temperature, relative humidity, and ammonia sensors (optional), an internal box temperature sensor 54 (optional) for monitoring the temperature experienced by the various components described hereinbefore, and a local hand-held data terminal 56 disposed externally on the housing of the controller 14 for permitting local user control and monitoring of the controller 14.

The physical layout of the components in the poultry house controller 14 is important to the overall system performance. The layout seen in FIG. 2 shows the power supply 34 located at the top right of the controller 14. The power supply 34 generates the most heat and is also the most heat tolerant. The location of the power supply 34 ensures that it does not heat up the other components, because heat rises and the other components are located below the power supply 34. Further, all the communication wires entering the controller 14 enter at the bottom which minimizes the amount of dust that enters the controller 14. The lightening protection mechanism 52 is located close to the bottom of the controller 14, right above the wire entry points. All signals except the optical signals from the host computer 16, pass through the lightening protection mechanism 52. The AC suppressor 36 is positioned at the bottom right of the controller 14, adjacent to the lightening protection mechanism 52. Finally, the chassis ground 38 preferably comprises an eight foot grounding rod to provide a good earth ground for the controller 14.

Figure 3:
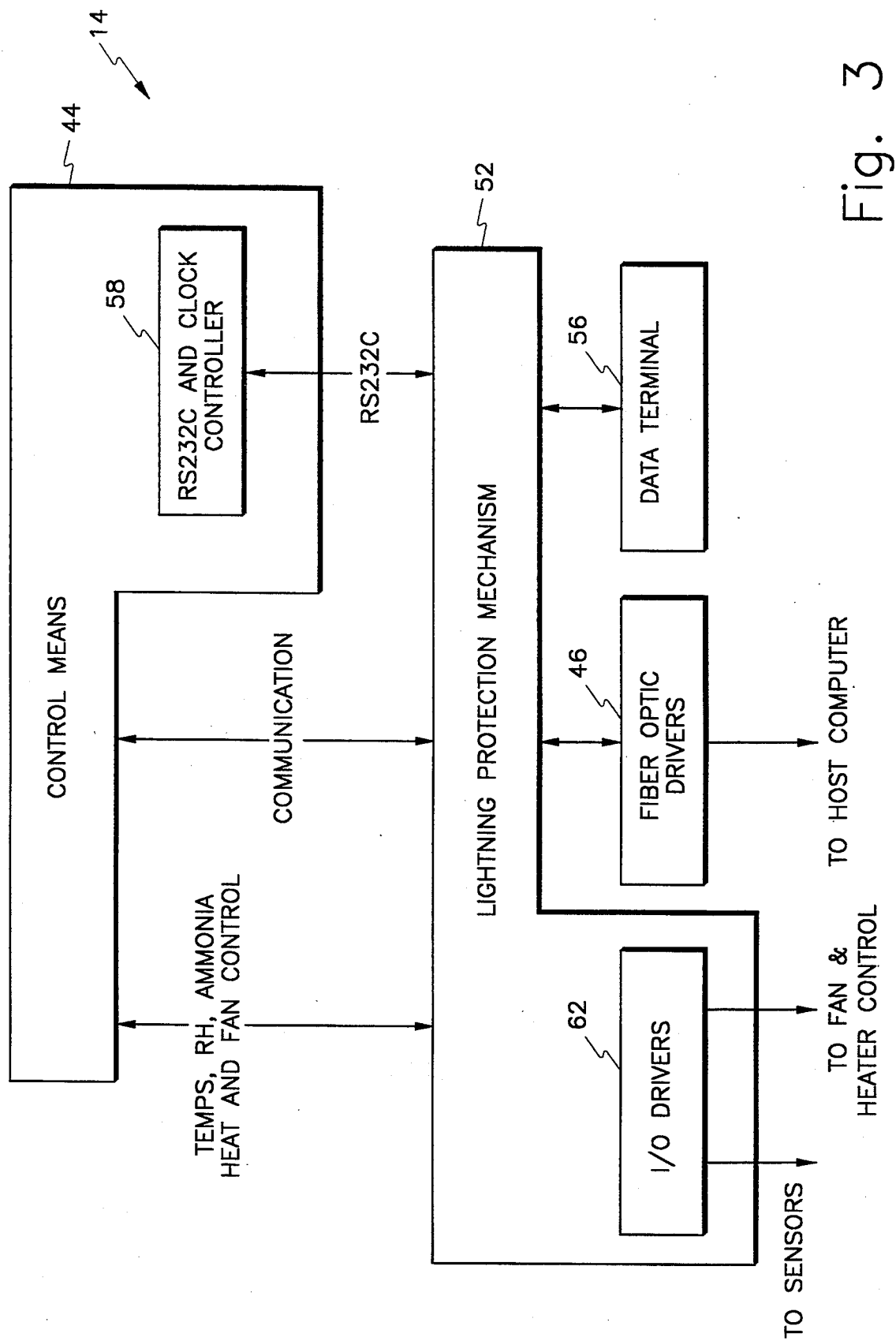
FIG. 3 is a block diagram illustrating the functional interaction of components within the poultry house controller of FIGS. 1 and 2.

A block diagram illustrating the functionality of the components of the poultry house controller 14 (FIG. 2) is shown in FIG. 3. With reference to FIG. 3, a control means 44 comprises a conventional bus controller, preferably a commercially available Bitbus controller manufactured by Industrial Service Technology, Inc., U.S.A., which runs an operating system, preferably an IDCX operating system manufactured and commercially available from the Intel Corporation, U.S.A. The foregoing operating system has multitasking capabilities to allow three independent programs to run concurrently, each of which adds to the overall functionality of the controller 14: (1) a communications program is responsible for implementing a bus protocol for handling low level communications with other devices via the bus network; preferably, a commercially available Bitbus communications program is utilized; (2) a control program 108 (FIGS. 7–12) is responsible for monitoring and controlling the environment within the poultry house 12 and is also responsible for communicating with the host communications program, thus allowing the control program 108 to respond to requests from the host computer 16; and (3) a user interface program is responsible for the system timing and also provides the user interface via the hand-held data terminal 56.

In the preferred embodiment, an RS232C and clock controller 58 situated within the control means 44 generates an interrupt every second. This interrupt is used by the user interface program to implement a system clock. Every ten seconds, the control program 108 (FIGS. 7–12) converts the sensed feedback signals from the temperature and humidity sensors 16, 18 from an analog signal to a digital signal. The digital values are then converted by equations to obtain ultimate values as to temperature, relative humidity, and perhaps ammonia level. These values are used to determine if fans 22 or heater 24 need to be turned on or off. Once the decision has been made, the control means 44 sends a signal to the relay mechanism 48 which turns the device on or off. The ten second data values are averaged over a 5 minute time period and this value is returned to the host computer 16 by the controller, if requested to do so by the host computer.

Figure 4:
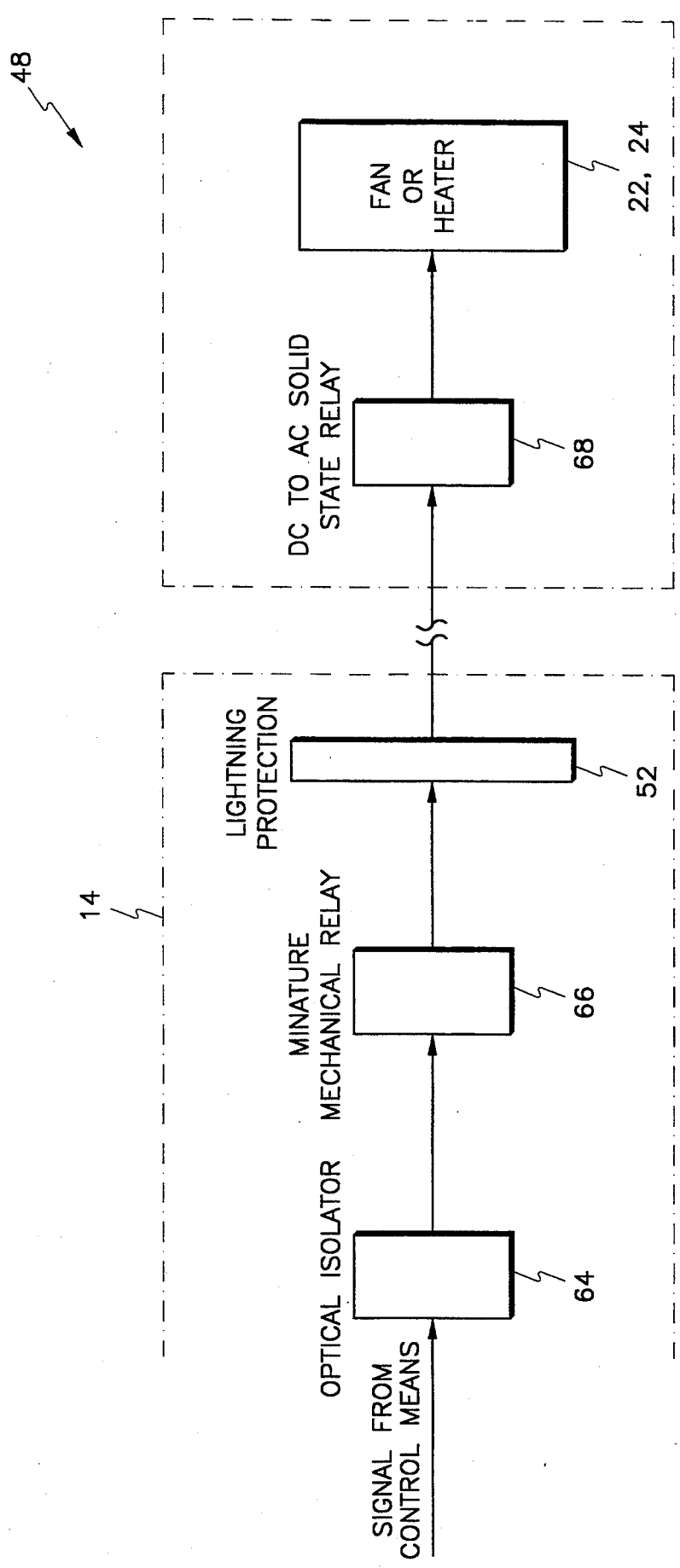
FIG. 4 is a block diagram illustrating the architecture of the lightning protection mechanism of FIG. 2.

A block diagram of the relay mechanism 48 of FIG. 2 is illustrated in FIG. 4. The relay mechanism 48 provides circuitry that insures that no backlash from the fan 22 or heaters 24 reached the controller 14. A signal from the control means 44 is used to drive an optical isolator 64, which in turns drives a miniature mechanical relay 66. The mechanical relay 66 provides additional isolation from solid state relays 68 which drive the fans 22 and heaters 24. The AC output side of the solid state relay 68 is used to switch either on or off the power to the fan 22 or heater 24. Moreover, the signal from the controller 14 to the solid state relay 68 is preferably 15 volts DC signal. This DC signal allows use of a standard 24 AWG twisted cable to control the fans 22 instead of running standard 12 AWG 3-conductor AC wiring. It should be further mentioned that the location of the solid state relay 68 at each fan 22 and each heater 24 makes it easy to retrofit the system into any existing house wiring, because power to each fan 22 may be connected in series with the solid state relay 68.

Most prior art computerized controllers for poultry houses utilize relays or contactors in the controller 14 to switch either on or off the AC power to the fans 22 and heaters 24. The AC power runs from the controller to each fan 22 and each heater 24. One major drawback of this approach is that multiple AC sources enter the controller, each adding some electrical noise to the controller especially the fans and heaters are switched. Another known method for controlling the fans 22 and heaters 24 is to send a signal over AC wiring to a smart switch located near the fan 22 or heater 24. This smart switch reads the signal on the AC line and turns the device on or off. Research shows that these switches are only about 93% reliable. Thus, about 7% of the time, the smart switches do not receive the control signal. This predicament is unacceptable in the instant situation where temperature control is critical to the lives of the poultry.

Figure 5:
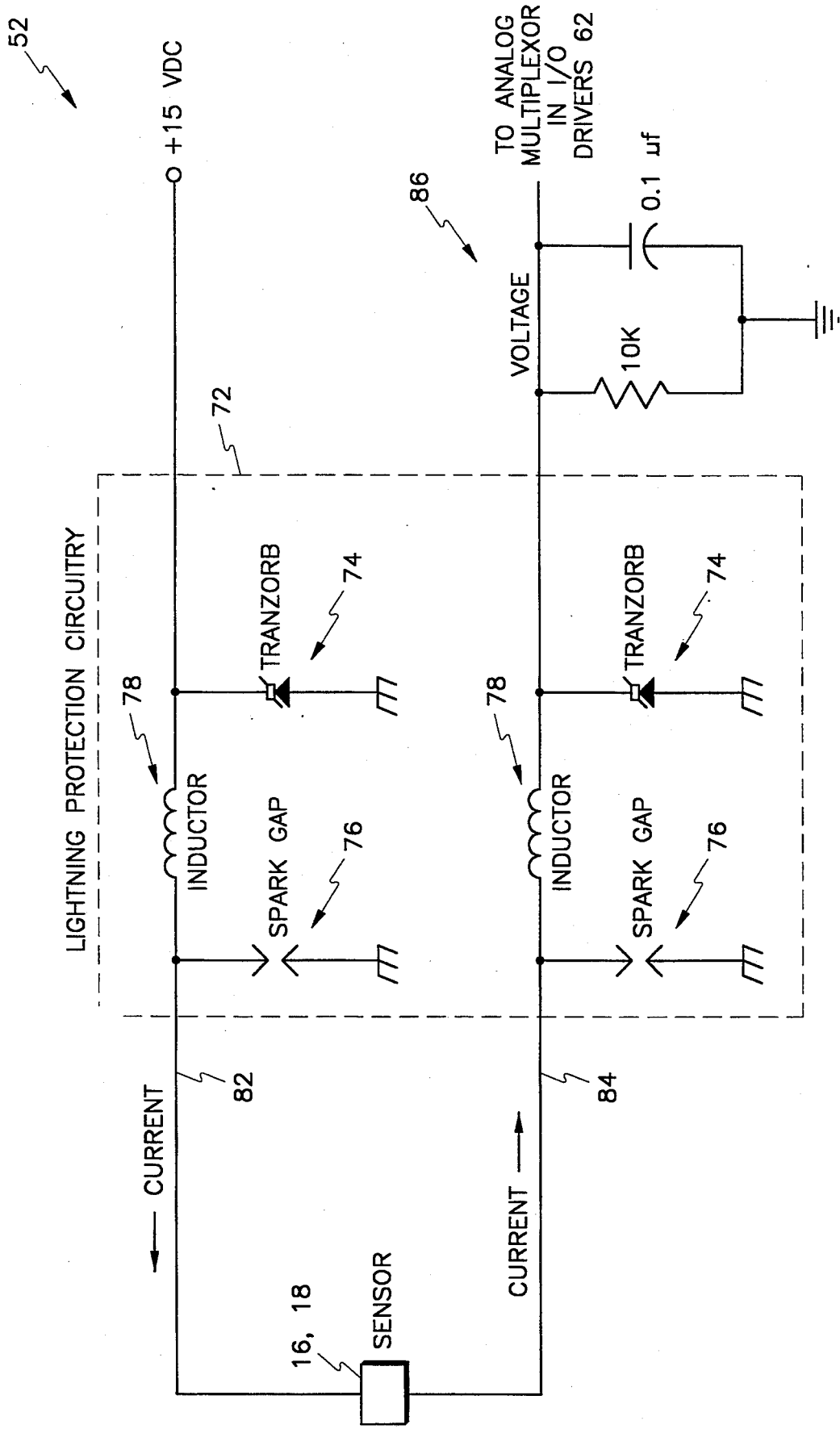
FIG. 5 is a circuit diagram illustrating the architecture of the lightning protection mechanism of FIGS. 2 and 4.

The lightening protection mechanism 52 is shown in further detail in FIG. 5. Lightening and other natural phenomena induce electrical noise which usually manifests itself as a high frequency, high energy electrical signal, which is very destructive to computer circuitry. The lightening protection mechanism 52 of FIG. 5 uses a double edge approach to remove electrical surges. In general, the lightening protection mechanism comprises a series of input/output (I/O) lightning protection circuits 72 serving as an interfacing circuit between each sensor 16,18 and the fans 22 and heaters 24.

As shown in FIG. 5, each lightening protection circuits 72 has a transzorb diode 74 and a spark gap 76 separated by an inductor 78 on both interconnect lines 82, 84 leading to a sensor 16, 18. In the system, a surge is defined to be any voltage greater than 15 volts, and the transzorb diode 74 and spark gap 76 short to ground anything greater than 15 volts. The spark gap 76 has the capability of shorting large amounts of current to ground, and it used to remove most of the energy in the surge signal. The spark gap 76 suffers from a slow response time to incoming surge, so the inductor 78 is used to block most of the high frequency signal allowing the spark gap 76 enough time to operate. The inductor 78 will allow low frequency signals to pass through, and those signals will be shorted to ground by the transzorb diode 74. Transzorb diodes have a very fast response time to an incoming surge, but cannot handle high energy signals. Thus, the job of the transzorb diode 74 is to short to ground any low frequency surges that make it past the spark gap 76 before the spark gap 76 has a chance to operate.

Also present in the lightening protection mechanism 52 is a filtering means 86 for stabilizing the temperature/humidity feedback signals sent to the controller 14 by filtering out high frequency noise. The temperature sensors 16 are current devices which produce current proportional to temperature, whereas the humidity sensors 18 are voltage devices which produce a voltage proportional to moisture content in the air. The temperature/humidity feedback signals from the temperature/humidity sensors 16, 18 are filtered by the filtering means 86 and are sent to a multiplexer, which allows the control means 44 to select any one of the analog inputs to go to an analog-to-digital convertor (ADC). In the preferred embodiment, the ADC has 12 bits of resolution and operates on a 0–10 volt range which gives a resolution of 2.44 millivolts per bit. The control means 44 uses the digitized values to determine the current temperature/humidity around the temperature sensors themselves as well as the global temperature/humidity (average overall temperature/humidity in the poultry house 12).

Figure 6:
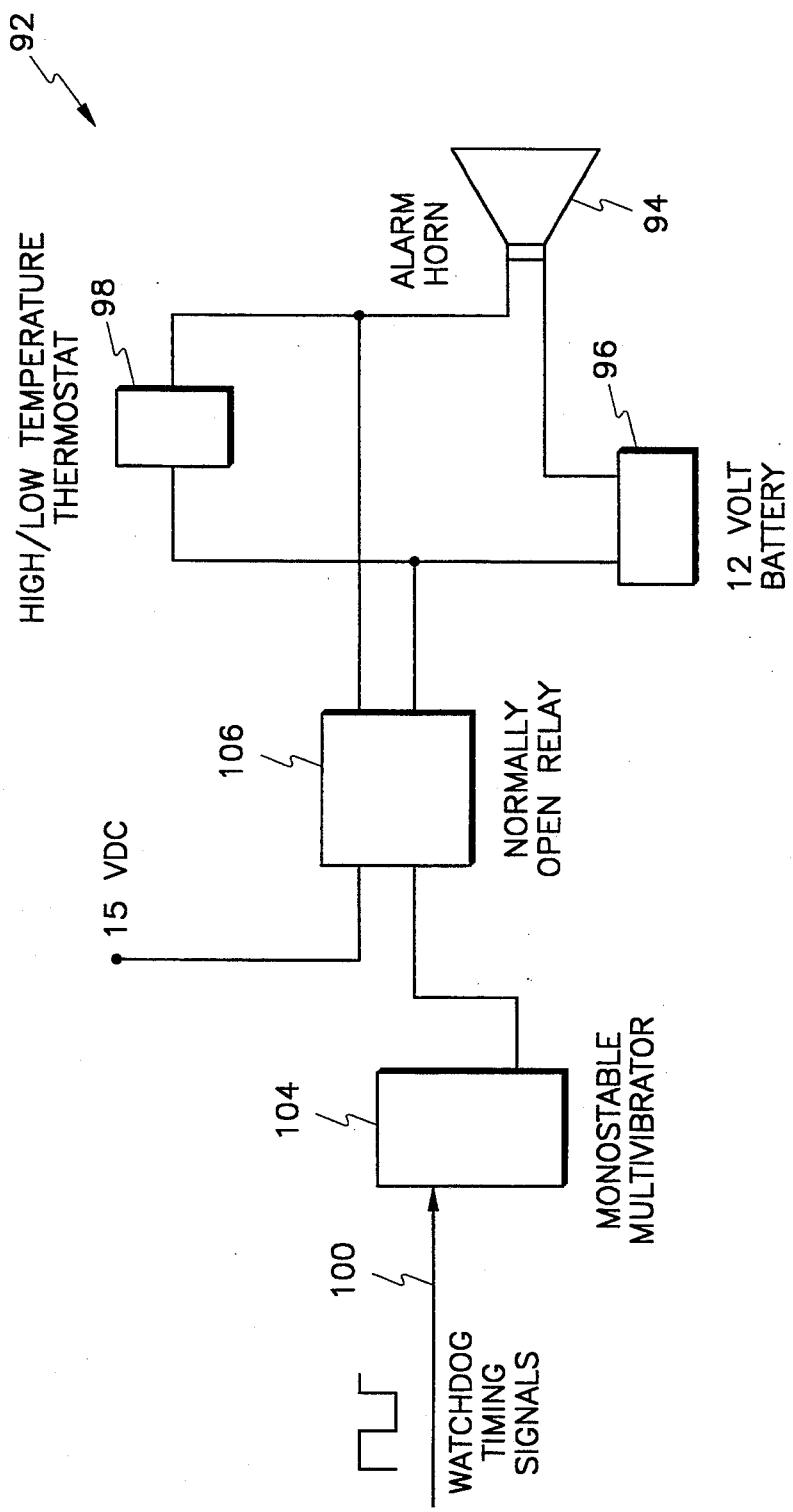
FIG. 6 is a block diagram illustrating an alarm system associated with the control means in the poultry house controller of FIGS. 1 and 2.

An alarm system for the poultry house controller 14 is illustrated in FIG. 6. The alarm system 92 may be incorporated into the control means 44. As shown in FIG. 6, the alarm system 92 comprises an alarm horn 94 powered by a battery 96, preferably 12 volts DC. The alarm system 92 may be activated by a number of events. For instance, if the temperature within the poultry house controller 14 rises above a preselected value, the controller will stop pulsing the watchdog timing signals 100, thus causing the alarm horn 94 to sound. Moreover, if the temperature within the poultry house 12 rises above a preselected high temperature value or below a preselected low temperature value, the high/low thermostat 98 connects the battery 96 to the alarm horn 94 for sounding of the alarm. Furthermore, the alarm system 92 also monitors the status of the control means 44 by monitoring watchdog timing signals 100 produced by the control program 108 (FIGS. 7-12). In essence, the watchdog timing signals 100 are periodic signals generated by the control means 44. In the preferred embodiment, the watchdog timing signals 100 are square pulses with short duration generated by control means 44 every ten seconds. The pulse is used to activate a monostable multivibrator 104 which keeps a relay 106 energized as long as a pulse occurs every 10 seconds. The 10 second pulse is generated by the control means 44 if it is operating correctly. If the control means 44 stops operating for any reason, then the watchdog timing signals 100 will stop, and the relay 106 will connect the battery 96 to the alarm horn 94, thereby sounding the alarm. Also worth noting is that the alarm horn 94 will sound if there is a loss of power or if the monostable vibrator 104 or relay fails.

Figure 7:
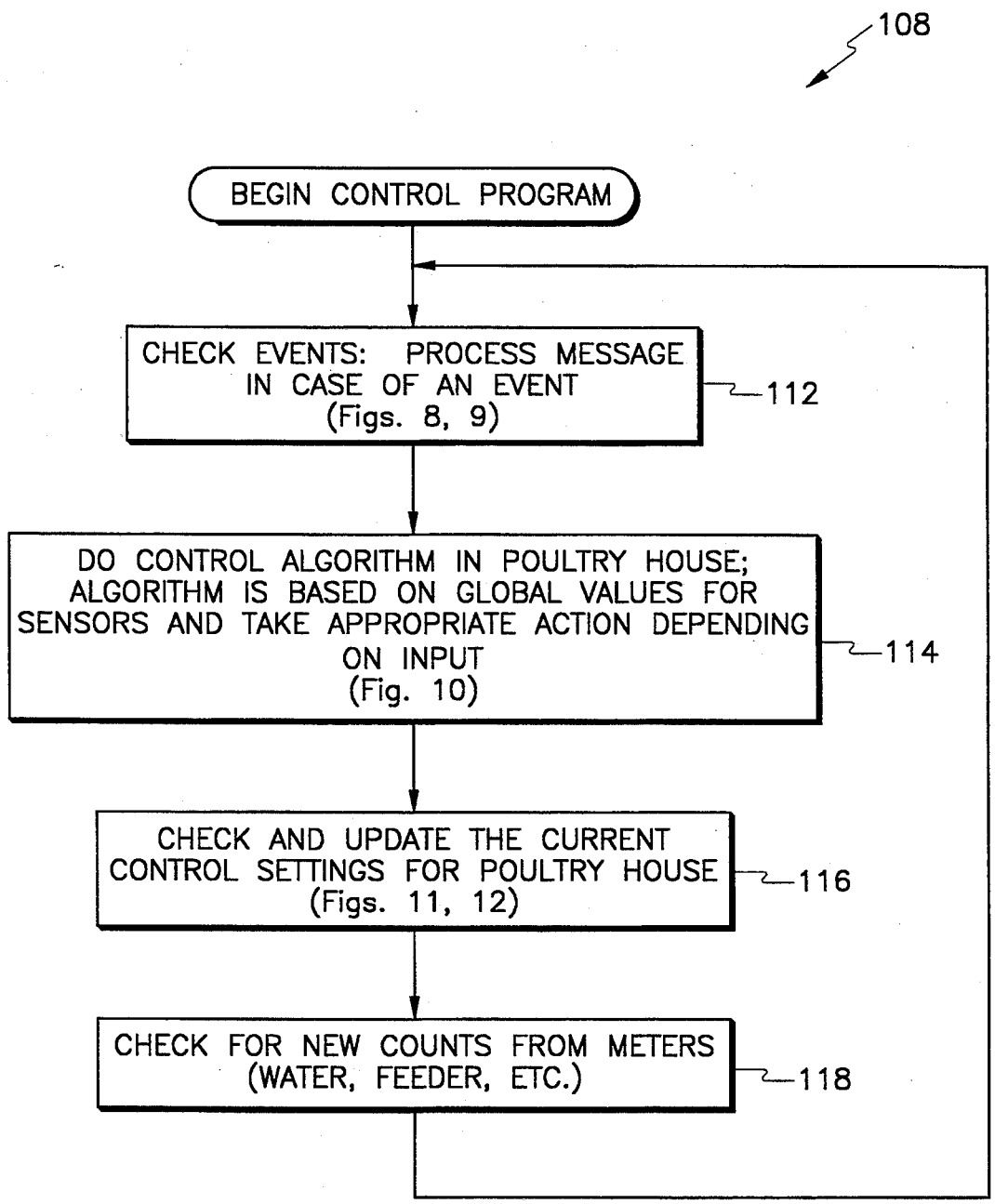
FIG. 7 is a flow chart illustrating the overall operation of a control program associated with a control means of FIG. 2.

The control program 108 associated with the control means 44 will now be described with reference to the flow charts in FIGS. 7 through 12. Referring to FIG. 7, the control program 108 commences by checking events. This process is indicated at a flow chart block 112. In this step, the program 108 determines whether a message has been sent from the data terminal 56 or the host computer 16. If a message has been sent, then the control program will process the message. Next, as shown in a flow chart block 114, the control program 108 performs a control algorithm in the poultry house 12. The control algorithm is based on global values for the temperature/humidity sensors 16, 18 and causes appropriate actions to take place depending upon sensed temperature/humidity feedback signals from the temperature/humidity sensors 16, 18.

Moreover, as shown in a flow chart block 116, the control program 108 next checks and updates the current control settings for the poultry house 12. In this step, the temperature/humidity sensors 16, 18 are monitored and values are retrieved from them. Also, a determination is made as to whether any of these temperature/humidity sensors 16, 18 are bad, and therefore, should be disregarded in determining global temperature/humidity values. Finally, the control program 108 checks the water and feeder levels by monitoring incoming pulses indicative of these elements. In the preferred embodiment, one voltage pulse is generated for every gallon of water available and present within the water dispensing unit, and one voltage pulse is generated for every 10 pounds of feed available and present within the feed dispensing unit.

Figure 8:
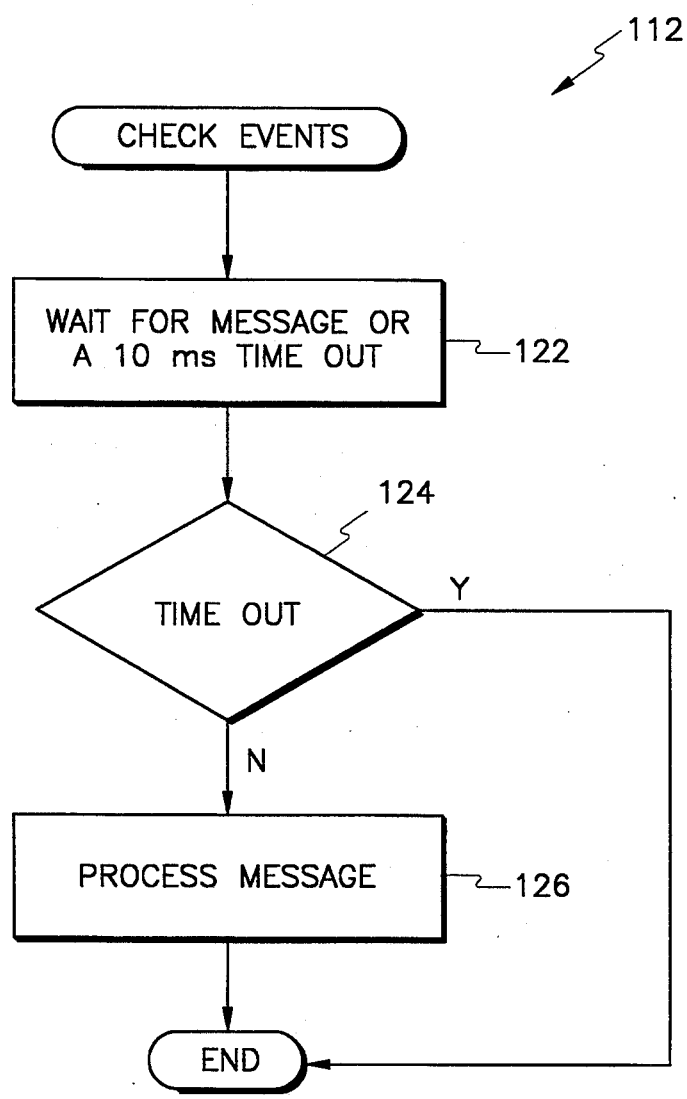
FIG. 8 is a flow chart illustrating a check events subroutine performed in the control program of FIG. 7.
Figure 9A:
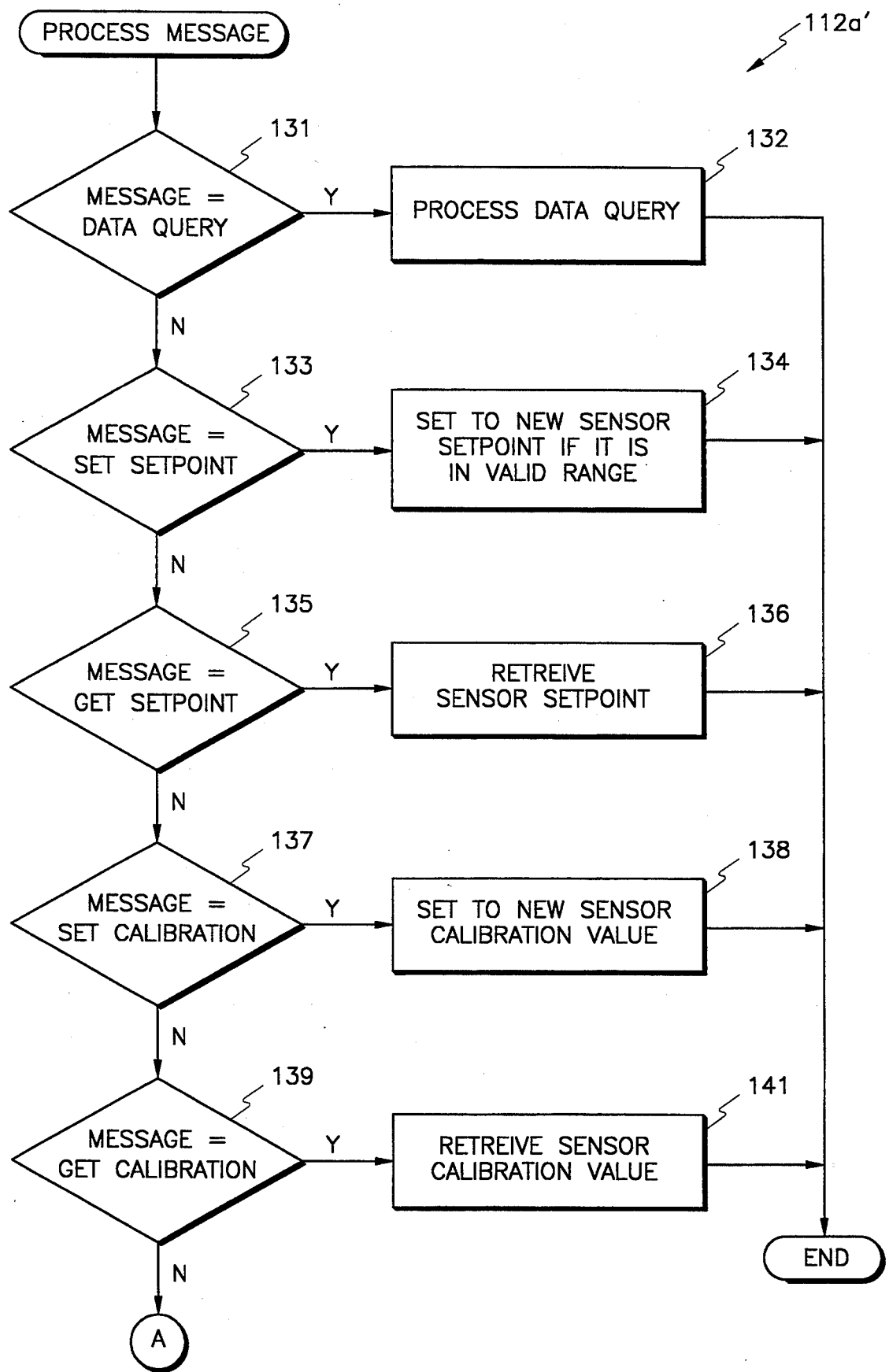
FIGS. 9A-9F collectively illustrate a flow chart which shows a message processing subroutine performed in a process message step in the control program of FIG. 7.
Figure 9B:
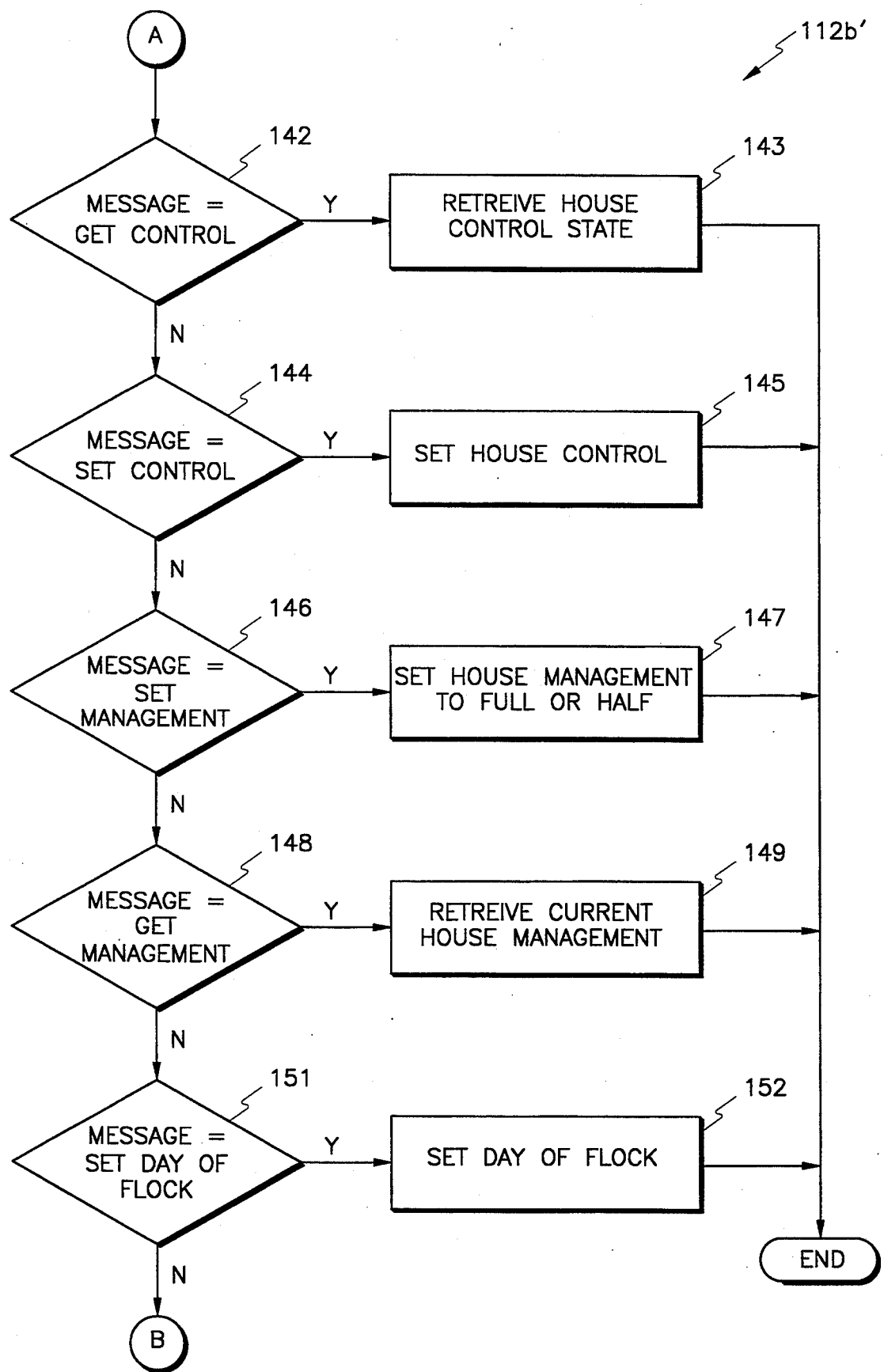
Figure 9C:
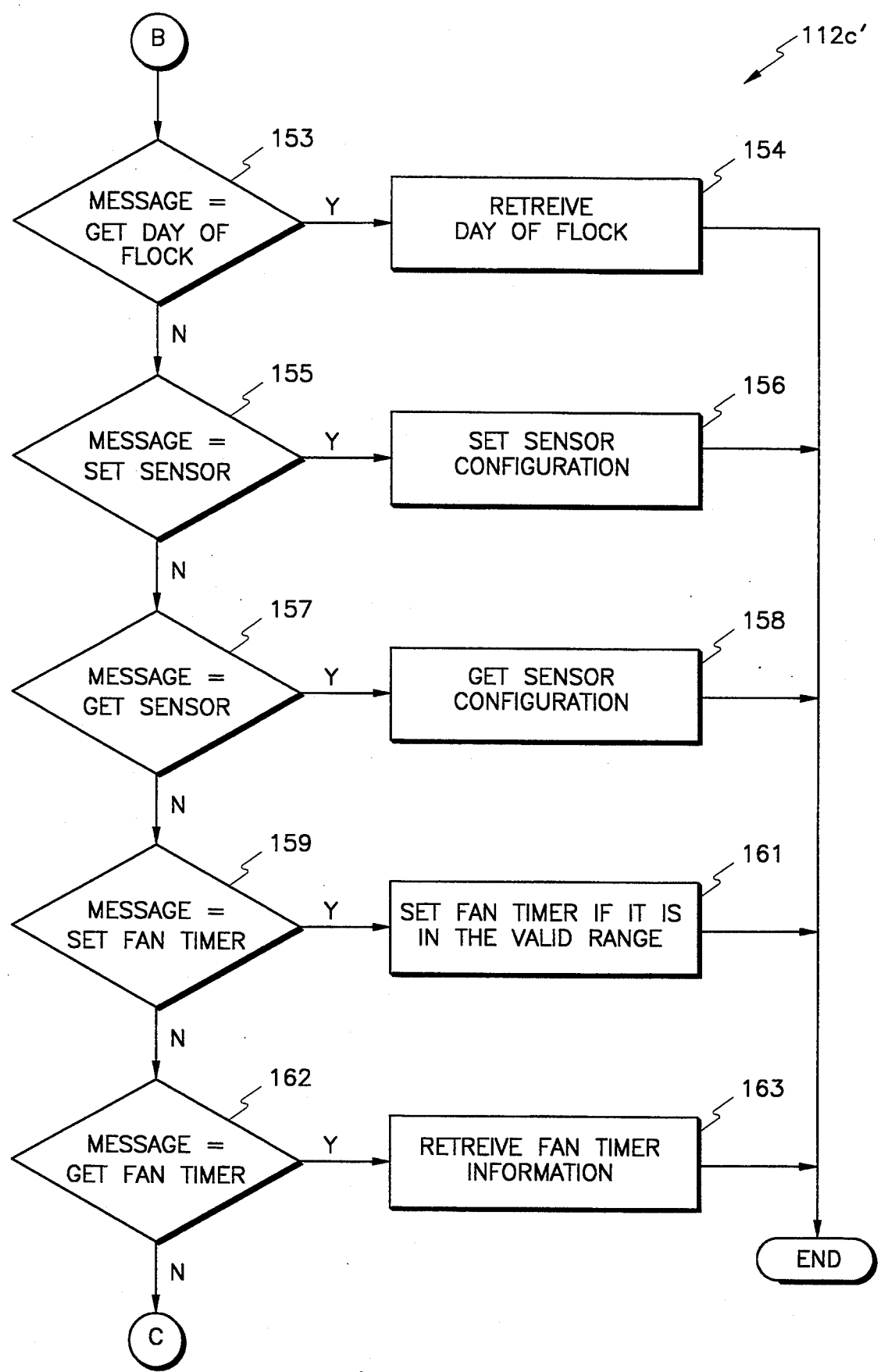
Figure 9D:
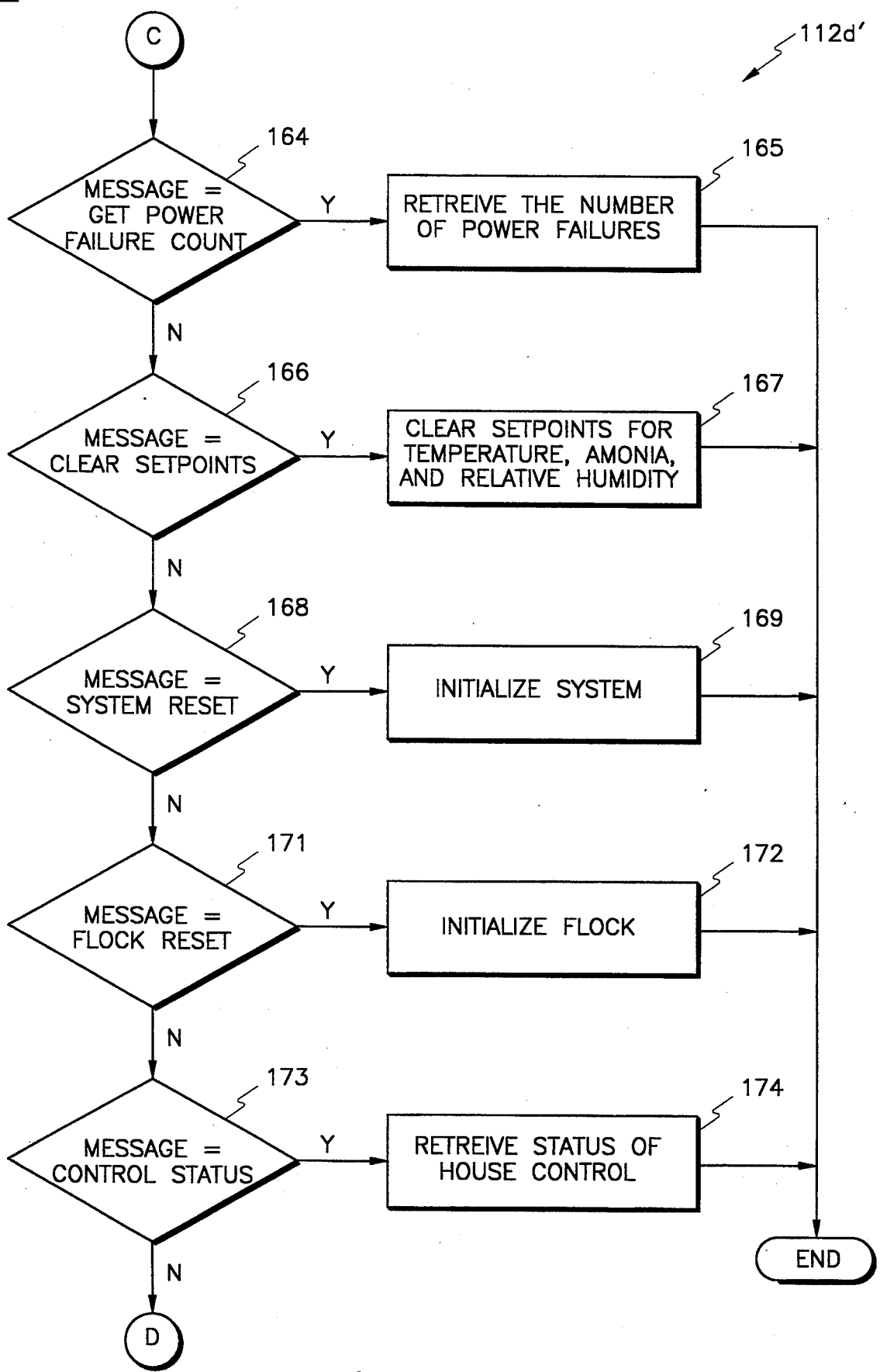
Figure 9E:
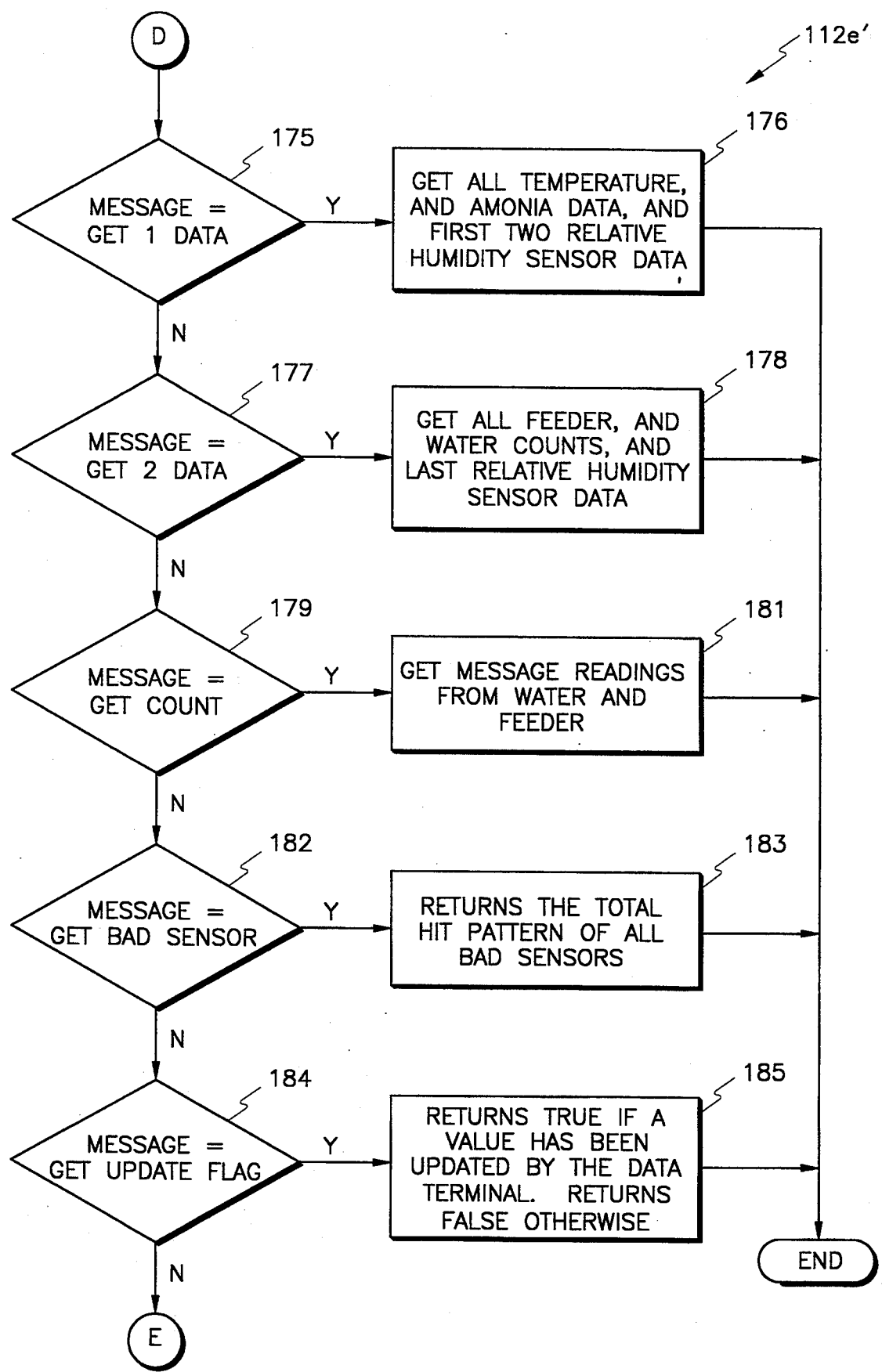
Figure 9F:
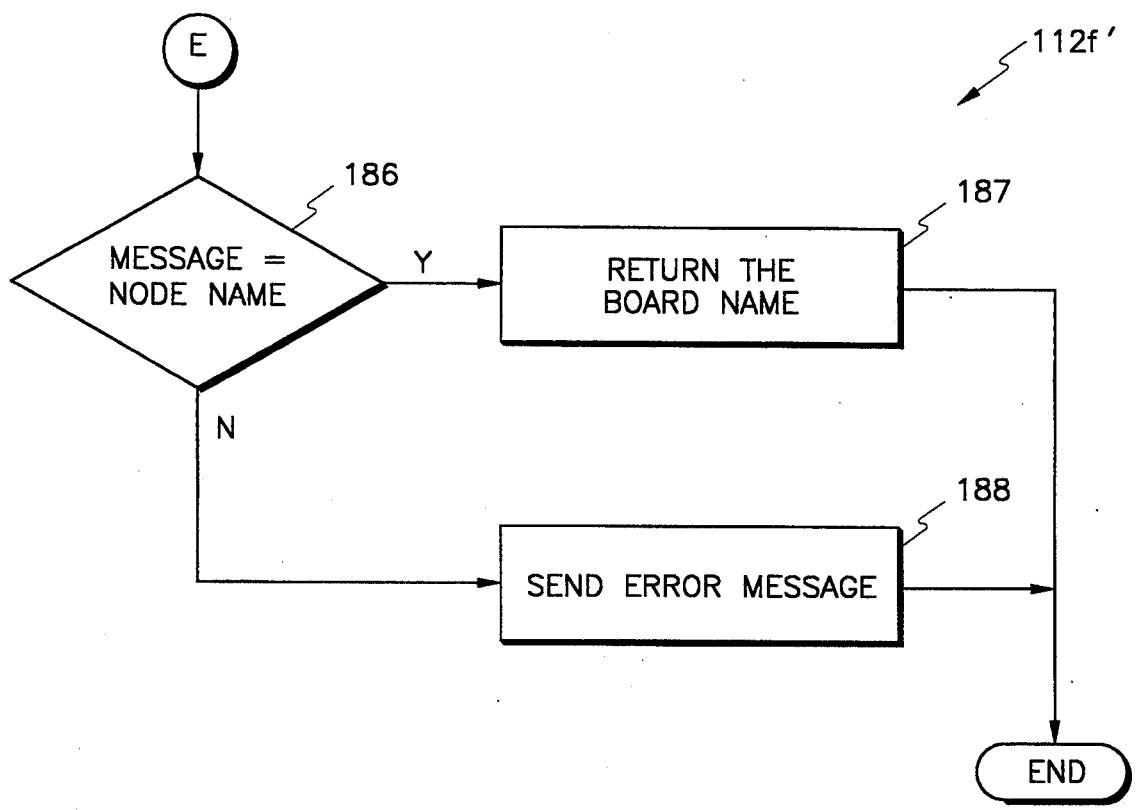

FIG. 8 shows the methodology for checking events in order to determine whether a message must be processed by the poultry house controller 14. As shown in FIG. 8, the control program 108 waits for a preselected time period, preferably 10 milliseconds, for receipt of a message. This operation is indicated at a flow chart block 122. If a message is received within the predetermined time period, then the control program 108 will process the message, as indicated at flow chart blocks 124, 126. Otherwise, the check events step terminates.

When a message is to be processed, the control program 108 follows a procedure set forth in FIGS. 9A through 9F. Numerous types of messages may be sent by the host computer 16 to the poultry house controller 14 for processing. The reader is referred to flow chart blocks 131 through 187 for a sampling of messages which may be communicated and which are implemented in the preferred embodiment. Of significance, messages could include retrieving and setting set points in the control program 108, including retrieving data from any of the temperature/humidity sensors 16, 18 and sending control signals to the fans 22 and heaters 24. If no message has been recognized by the control program 108, then an error message is sent to the host computer 16, as indicated in a flow chart block 188, via the user interface program.

Figure 10A:
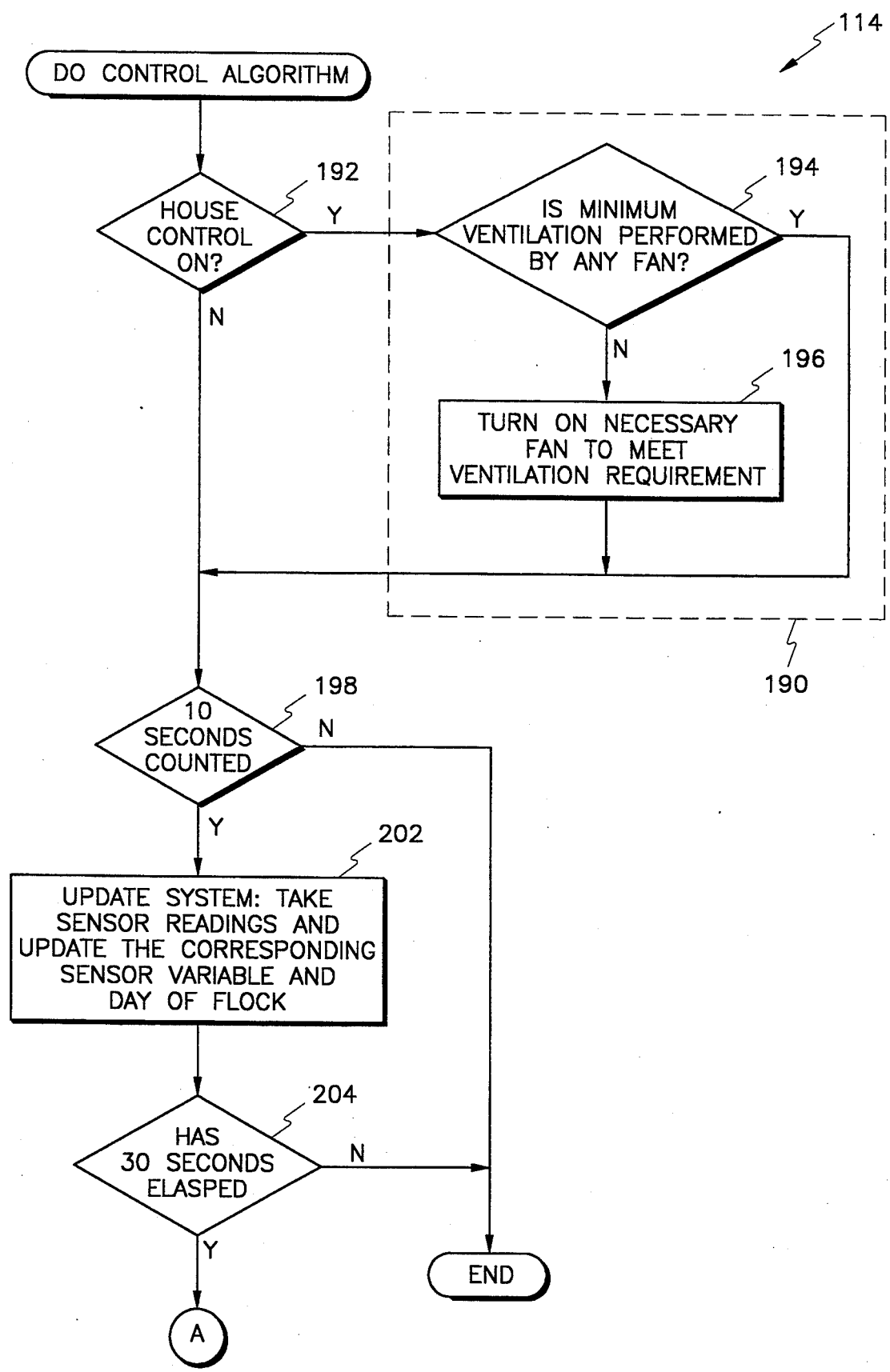
FIGS. 10A-10B is a flow chart illustrating a control subroutine performed in the control algorithm step in the control program of FIG. 7.
Figure 10B:
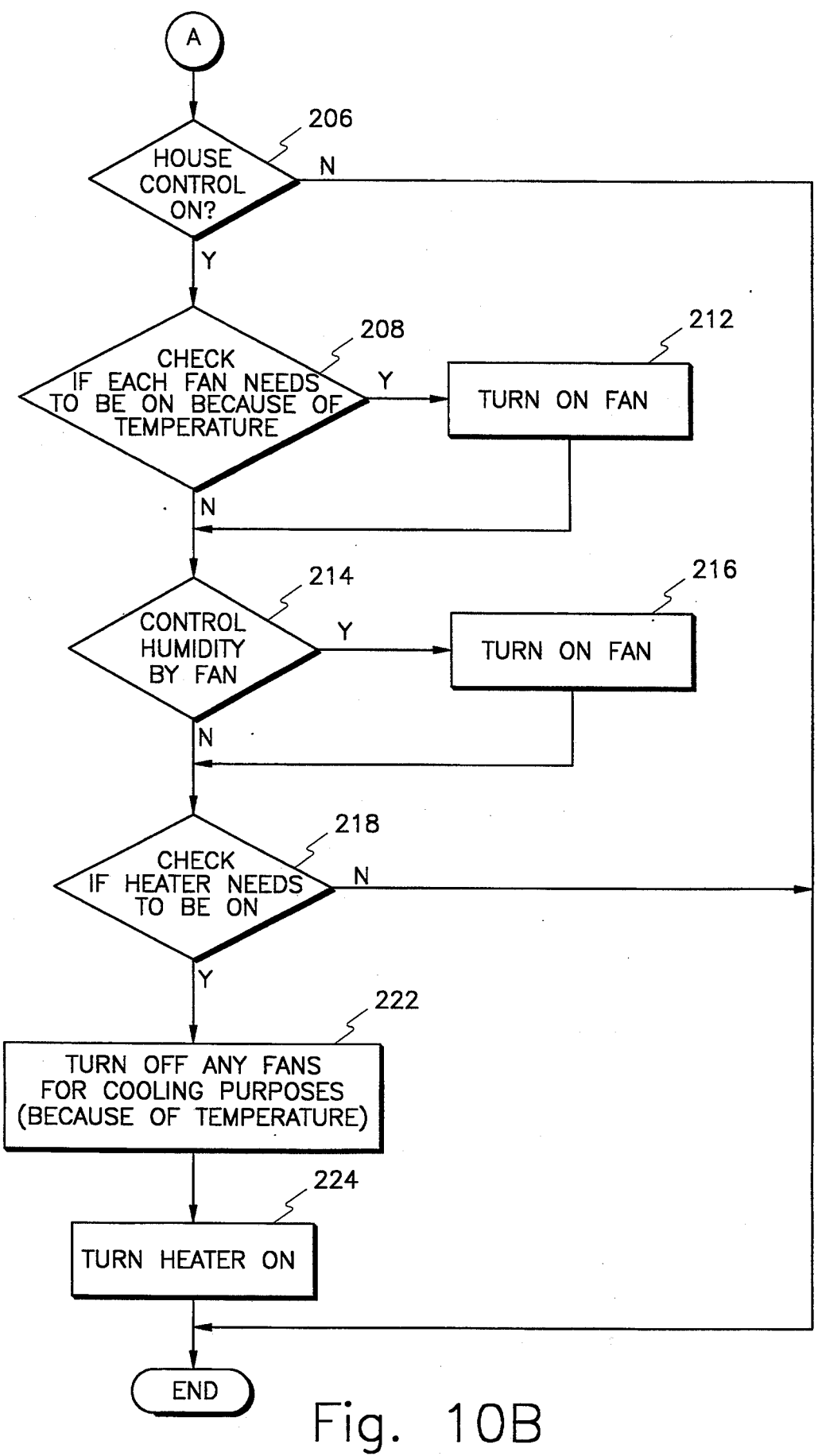

The control algorithm set forth in step 114 of FIG. 7 is shown in further detail in FIG. 10. Referring to FIGS. 10A–10B, the control program 108 first determines whether the poultry house 12 is being controlled by the poultry house controller 14. In accordance with a significant aspect of the present invention, as further discussed hereinbelow, the fans 22 are optimally controlled to provide for both minimum ventilation requirements and modification of temperature/humidity within the poultry house 12. Because of ammonia and dust levels within the poultry house 12, fans 22 must be actuated periodically in order to ventilate the poultry house 12. Generally, this minimum ventilation requirement is defined as a predefined time period within a predefined time interval in which a fan must be actuated. For example, in the preferred embodiment, the predefined time interval is 10 minutes and the predefined time period in which a fan 22 must be activated during this time interval is approximately 1 to 5 minutes. In conventional embodiments, operation of fans 22 to meet the minimum ventilation requirements is completely independent from operation of the fans 22 in order to modify the temperature/humidity within the poultry house 12. In accordance with the present invention, both of these operations are monitored together and are optimally performed in a handshaking technique. If a fan 22 has been operated during the predefined time interval, then the time in which it was actuated is used to decrease the predefined time period in which the designated fan for meeting minimum ventilation requirements was to be actuated. The foregoing concept is apparent by examining the flow chart of FIGS. 10A–10B.

Referring to FIGS. 10A–10B, the control algorithm first determines whether the poultry house 12 is being controlled by the poultry house controller 14, as indicated in a flow chart block 192. If so, then the control algorithm makes a determination as to whether the minimum ventilation requirements have been met during the predefined time interval. If the minimum ventilation requirement had been met, then the fan 22 designated for this purpose is not actuated during the predefined time interval. However, if the minimum ventilation requirement has not been met, then the fan 22 is actuated for a time amount necessary to meet the minimum ventilation requirement. The foregoing functionality is indicated at flow chart blocks 194, 196 of phantom block 190.

If the poultry house controller 14 is not controlling the poultry house 12, then the control algorithm, after a 10 second delay as noted at flow chart block 198, updates the system by analyzing the readings from the temperature/humidity sensors 16, 18. After a 30 second delay, the control algorithm checks again whether the poultry house 12 is being controlled by the poultry house controller 14. If so, the control algorithm causes the control means 44 to check if each of the fans 22 must be actuated because of high temperature within the poultry house 12. If the temperature is too high, then one or more fans are turned on, as indicated in flow chart blocks 208, 212. Otherwise, the control algorithm will move on and determine whether the humidity is too high in the poultry house 12. If so, then one or more fans 22 will be actuated, as indicated in flow chart blocks 214, 216.

Next, the control algorithm determines if it is too cold within the poultry house 12, as indicated in the flow chart block 218. In the event that it is too cold in the poultry house 12, the fans 22 are turned off, as shown in flow chart block 222, and one or more heaters 24 are actuated, as shown in a flow chart block 224.

Figure 11:
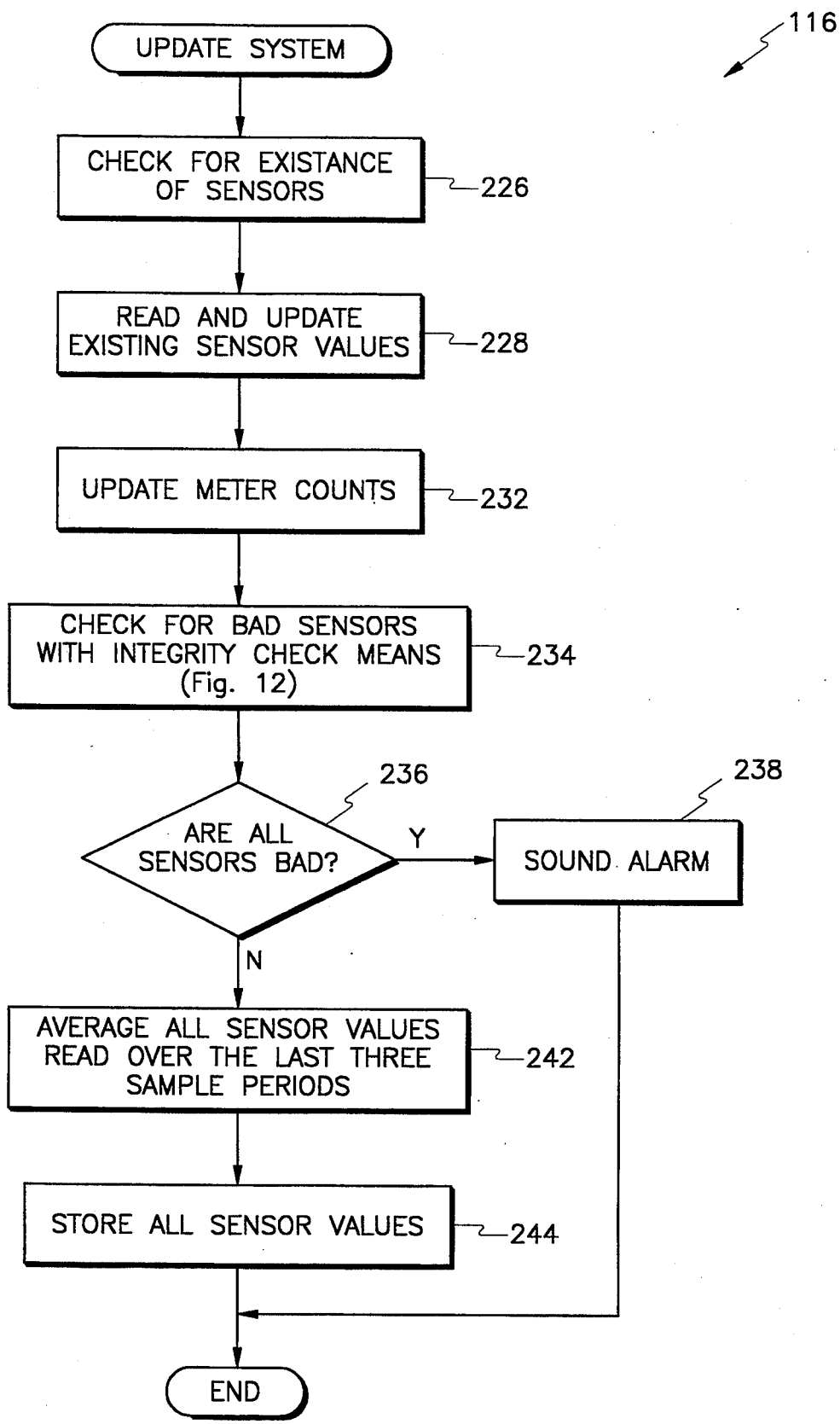
FIG. 11 is a flow chart illustrating an update subroutine performed in an update step in the control program of FIG. 7.

FIG. 11 shows the methodology for updating current control settings in the poultry house 12, as denoted in flow chart block 116 of FIG. 7. The control program 108 determines the number and location of the temperature/humidity sensors, 16, 18, as indicated in a flow chart block 226. Hence, the control program 108 is capable of configuring itself. Next, the temperature/humidity sensors 16, 18 are read and their corresponding program variables are updated, as shown in a flow chart block 228. As indicated by a flow chart block 232, the meter counts associated with the feed and water for the poultry are updated. Further, the control program 108 determines whether any of the temperature/humidity sensors 16, 18 are malfunctioning, as indicated at a flow chart block 234. If any of the temperature/humidity sensors 16, 18 are malfunctioning, then the temperature/humidity values retrieved from the bad sensors 16, 18 are eliminated from consideration and will not be used in later analysis. Next, as shown in a flow chart block 236, a determination is made as to whether all of the temperature sensors 16 or all of the humidity sensors 18 are malfunctioning. If all of either of the sensors 16, 18 are malfunctioning, then the alarm horn 94 in the alarm system 92 is actuated via termination of the watchdog timing signals 100 by the control means 44. This predicament is indicated in a flow chart block 238.

If one or more of both the temperature sensors 16 and humidity sensors 18 are still functioning, then the control program 108 averages all of the temperature sensor values read over the last three sample periods, each preferably 10 seconds in the preferred embodiment and averages all of the humidity sensor values read over the last three sample periods in order to generate a global temperature value and a global humidity value, respectively. See flow chart block 242. Finally, all of the temperature/humidity sensor values from all of the functioning temperature/humidity sensors 16, 18 as well as the global temperature/humidity values (overall averages respectively) are stored in memory, as shown in a flow chart block 244.

Figure 12:
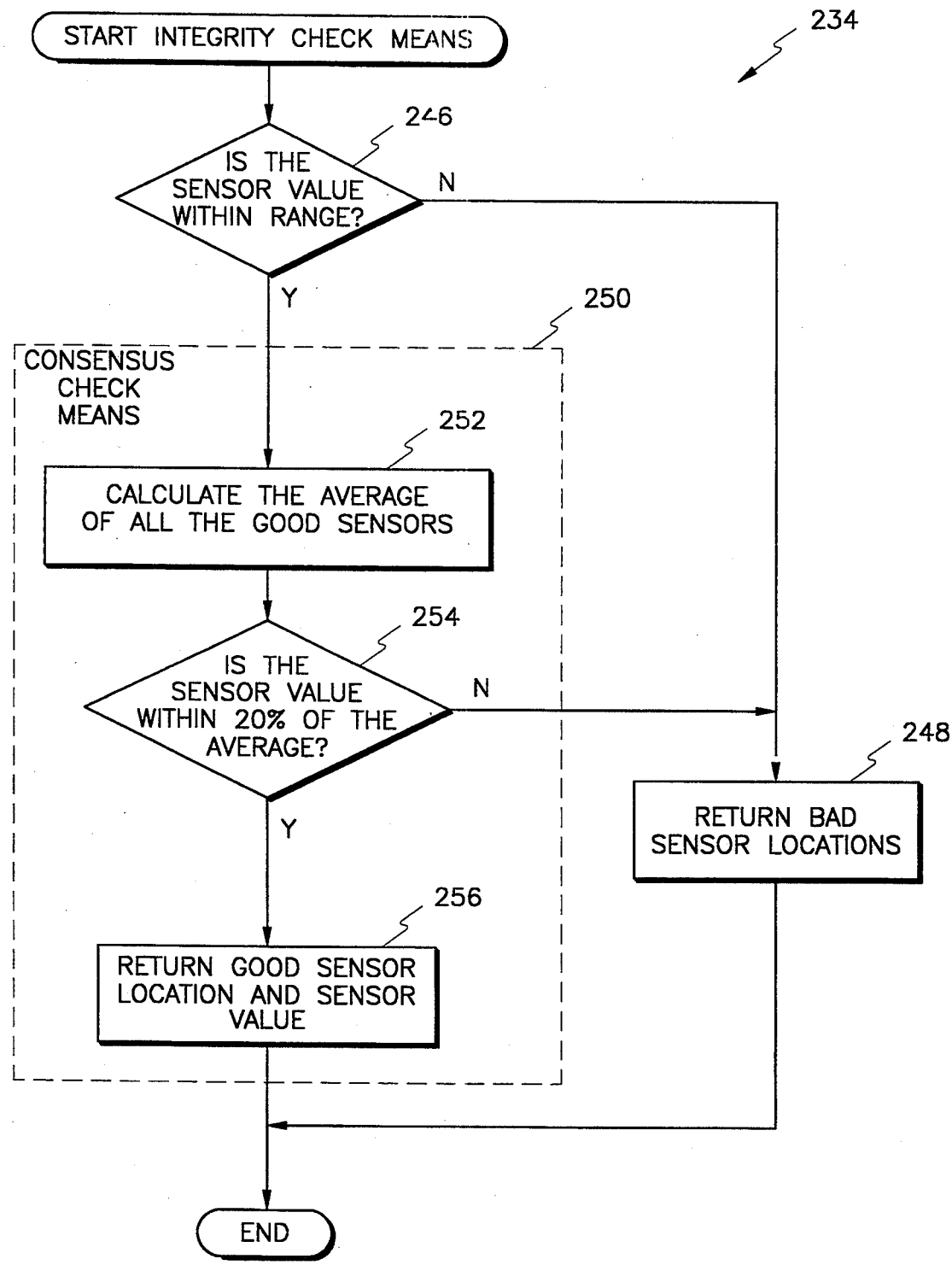
FIG. 12 is a flow chart illustrating an integrity check subroutine performed in an integrity check step of the update subroutine of FIG. 11.

An important feature of the present invention is illustrated in FIG. 12. FIG. 12 shows an algorithm for determining whether temperature and/or humidity sensors 22, 24 are malfunctioning in order to ensure the integrity of the system and specifically the global temperature and humidity values generated in the flow chart block 242 of FIG. 11. The integrity check means 234 of FIG. 12 is employed for both the temperature sensors 16 and the humidity sensors 18. Referring to FIG. 12, as indicated in flow chart block 246, a determination is made as to whether a feedback signal is within a predefined range on an absolute scale. In the case of temperature, it is determined whether the sensor value is approximately between 50° F. and 120° F. In the case of humidity, it is determined whether the sensor values are approximately between 0% and 100% on a relative humidity scale. If a sensor value does not meet the foregoing criterion, then the temperature or humidity sensor 16, 18 corresponding with the bad sensor value is flagged as a malfunctioning sensor and the location of the malfunctioning sensor 16, 18 is identified and stored, as noted at a flow chart block 248.

In the event that the sensor value is within the predefined range on the absolute scale, then the sensor value is utilized in the determination of an average. The values corresponding with other temperature/humidity sensors 16, 18 of like kind are averaged together. In other words, in the case of temperature, all of the temperature values corresponding with the other temperature sensors 16 are averaged together. Next, a determination is made as to whether the current sensor value is within 20% of the computer average of all other sensors. If not, then the current sensor value is considered bad and the location of the corresponding sensor is identified and recorded. However, if the current sensor value meets the foregoing criteria, then the current sensor value is utilized by the control program 108, as noted at flow chart block 256.

Figure 13:
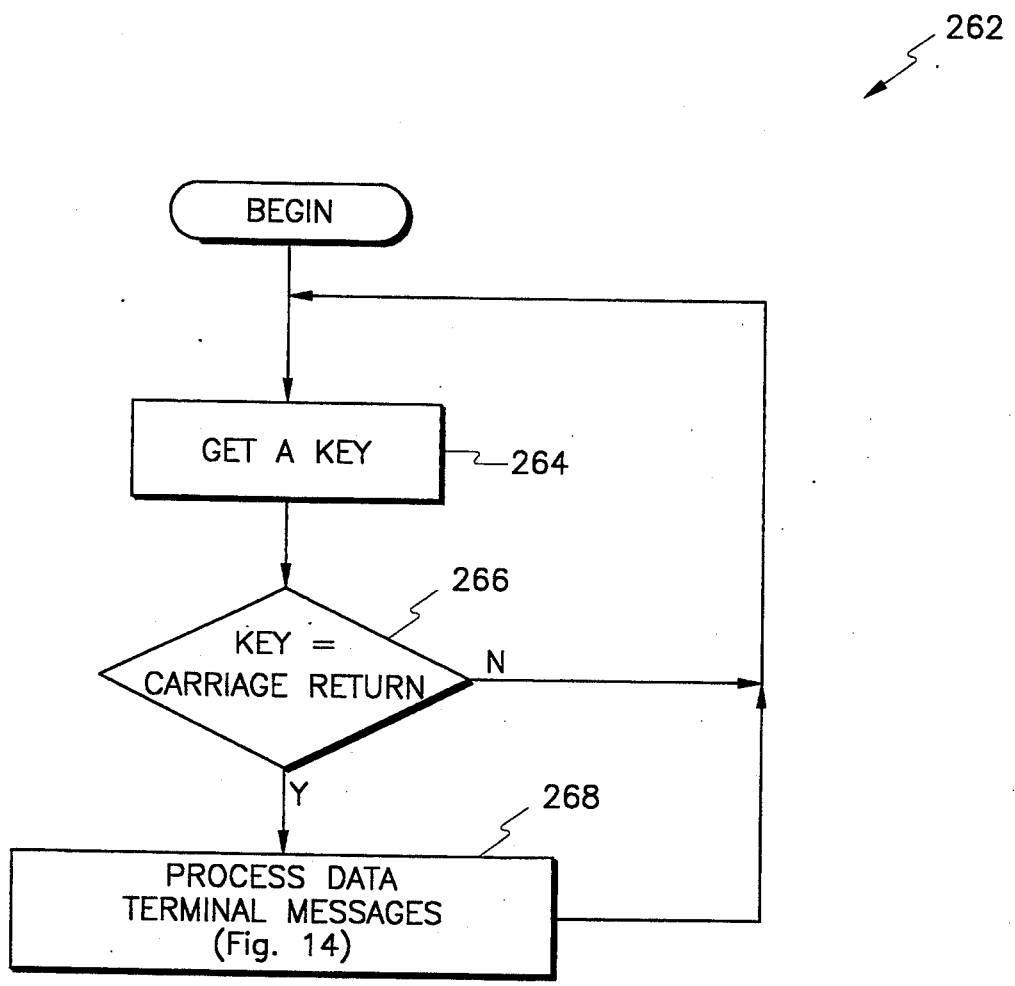
FIG. 13 is a flow chart of a user interface program for the control means of FIG. 2.

A user interface program 262 is shown in FIG. 13. The user interface program 262 runs concurrently with the control program 108 of FIG. 7. Referring to FIG. 13, the user interface program 262 monitors the key pad associated with the data terminal 56 and the host computer 16. After a key is received, the user interface program 262 waits for a certain time period to receive a carriage return ("Enter" key). If it does not receive a carriage return within the time period, then the user interface program 262 returns back to the beginning, as shown. Otherwise, if the user interface program 262 does receive a carriage return, then the user interface program 262 processes the key and message associated with the key, as noted at flow chart block 268.

Figure 14A:
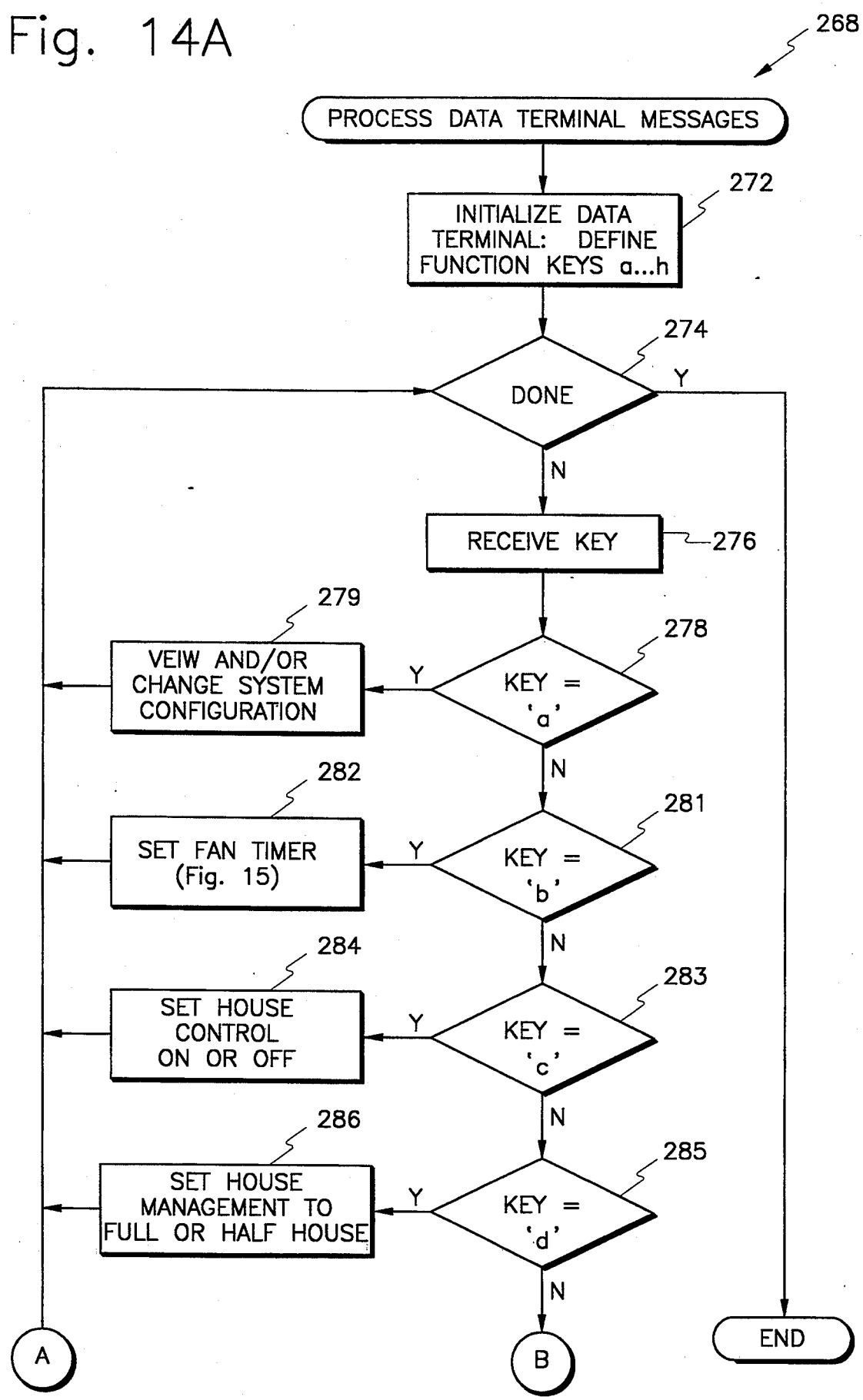
FIGS. 14A-14B is a flow chart illustrating a process data subroutine performed in a process data step of the user interface program of FIG. 13.
Figure 14B:
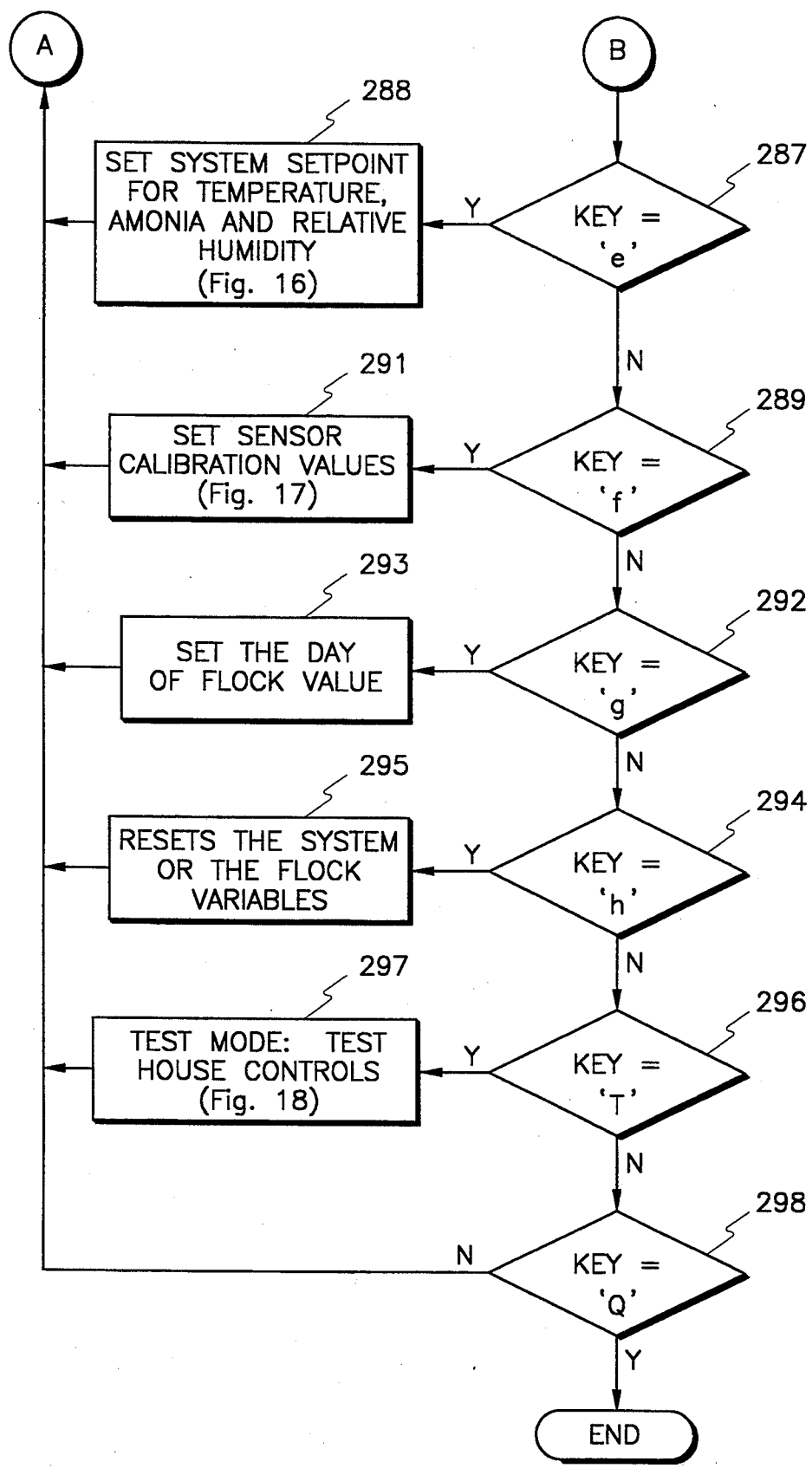

FIGS. 14A-14B shows the procedure for processing messages. Referring to FIG. 14, at a flow chart block 272, the user interface program 262 initializes the data terminal 56 by defining the function keys a through h on the screen so that the user knows what commands correspond with the various function keys. Next, the system determines which function key has been selected and which command is associated with the selected function key. This procedure is indicated at flow chart blocks 276 through 298. The various possible commands, which are contained in the preferred embodiment, are self-evident from examination of the flow chart in FIGS. 14A-14B.

Figure 15:
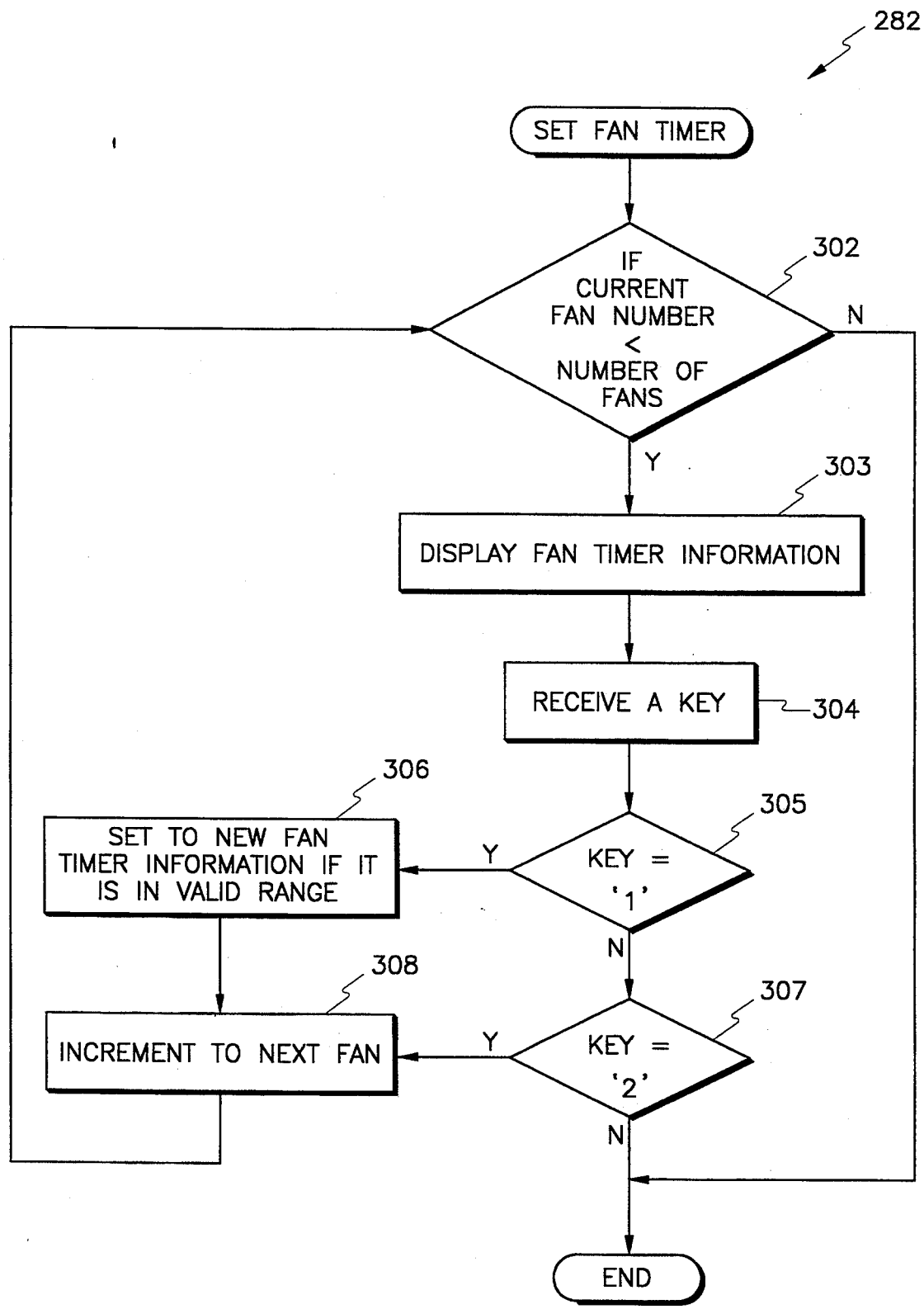
FIG. 15 is a flow chart illustrating a subroutine performed in a set fan timer step of the user interface program of FIG. 13.

FIG. 15 shows the procedure for setting the timing mechanisms associated with the fans 22 as set forth in the flow chart block 282 of FIG. 14. Referring to FIG. 15, the user interface program 262 loops around and analyzes each of the fan timers associates with the fans 22. A decisional flow chart block 284 ensures that the user interface program 262 considers all of the fan timers and stops after the last fan timer. While the user interface program 262 toggles through each fan timer, the particular fan timer which is at issue at a particular point in time is displayed so as to inform the user. See flow chart block 286. After a fan timer has been displayed, the user interface program 262 waits until receiving a key from the user as noted at a flow chart block 288. In the preferred embodiment, if the user enters "1," then the fan timer information can be manipulated by the user by entry of the desired information by the user on the associated key pad. This feature is indicated at flow chart blocks 291, 292. If programming of new fan timer information takes place, then the user interface program 262 will next increment the loop to the next fan timer, as noted at a flow chart block 294. If the user selected key "2" instead of key "1," then the user interface program 262 increments to the next fan timer, as shown in the flow chart block 294. If neither key 1 or 2 has been selected by the user, then the looping process shown in FIG. 15 terminates.

Figure 16:
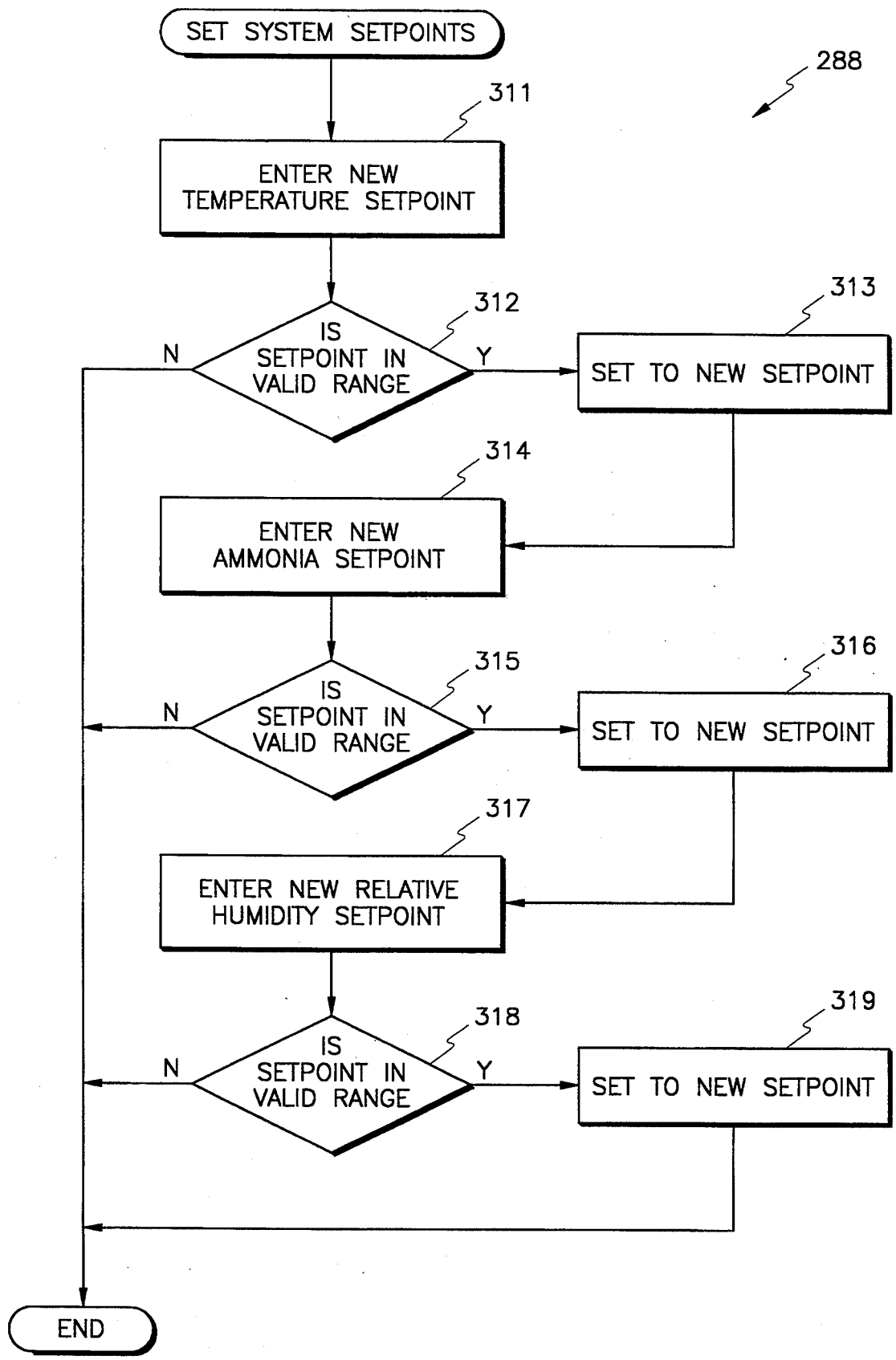
FIG. 16 is a flow chart illustrating a subroutine performed in a set system set point step of the user interface program of FIG. 13.

FIG. 16 shows the procedure which the user interface program 262 utilizes for setting the system set points, as required in the flow chart block 288 of FIGS. 14A-14B. With reference to FIG. 16, the user interface program 262 prompts the user to enter a new temperature set point for the poultry house 12, as noted at flow chart block 289. The temperature set point which is entered by the user is compared with values within a predefined valid range. If the new temperature set point is within the valid range, then the new temperature set point is recorded and utilized. Otherwise the new temperature set point is ignored and the procedure terminates.

After a new temperature set point has been set, the user interface program 262 prompts the user for a new ammonia set point, as noted at flow chart block 293. If the new ammonia set point which is entered by the user is within a predefined valid range, then the new ammonia set point is recorded and utilized. Otherwise, the procedure terminates.

After a new ammonia set point has been set, the user interface program 262 prompts the user for a new relative humidity set point, as noted at a flow chart block 296. If the new relative humidity set point is within a predefined valid range, then the new relative humidity set point is recorded and utilized. Otherwise, the procedure terminates, as shown.

Figure 17:
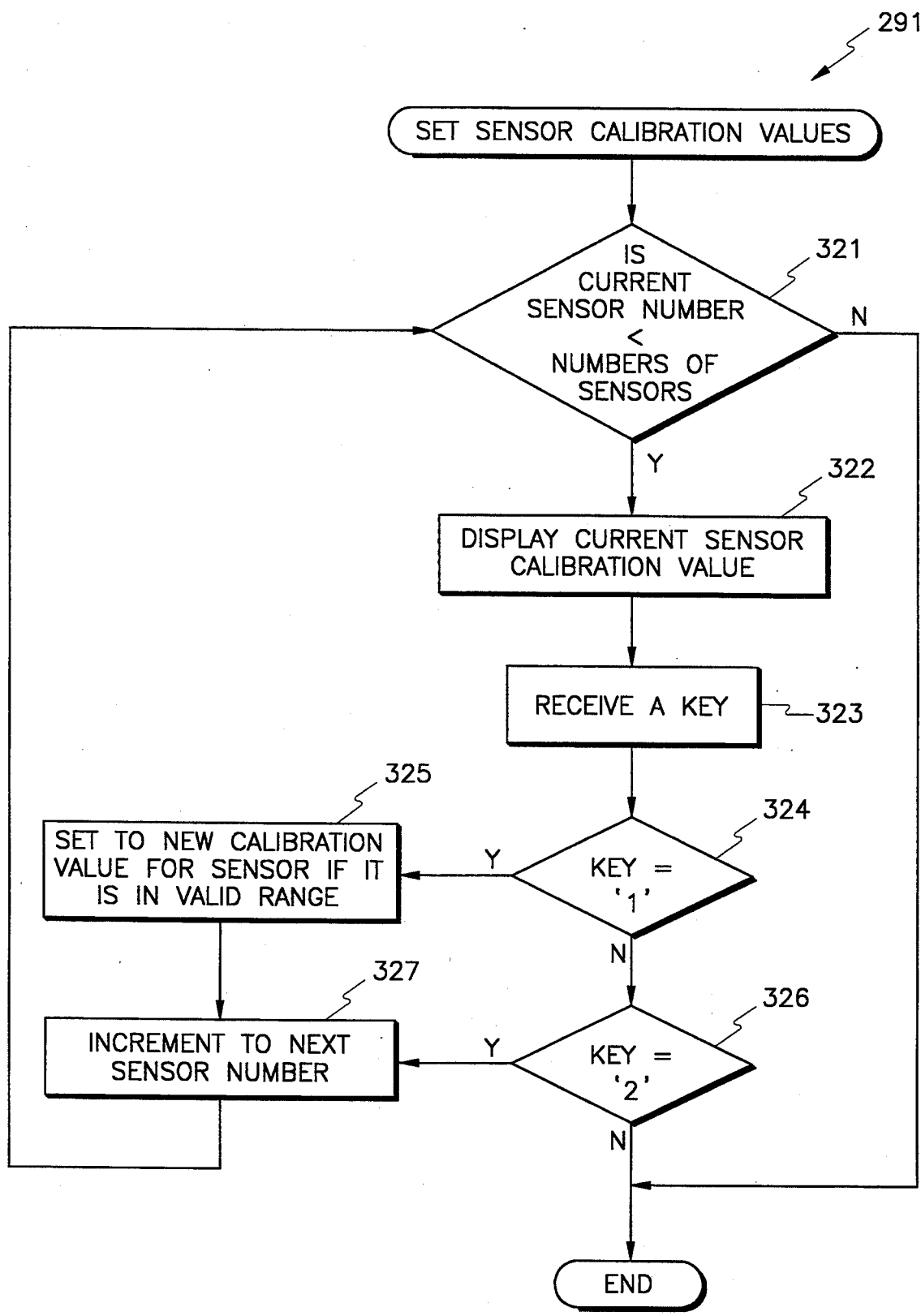
FIG. 17 is a flow chart illustrating a subroutine performed in a set sensor calibration values step of the user interface program of FIG. 13.

FIG. 17 shows the procedure utilized by the user interface program 262 when setting sensor calibration values, as noted at the flow chart block 291 of FIG. 14. Referring to FIG. 17, the user interface program 262 loops around and analyzes each of the temperature/humidity sensors 16, 18. After analyzing each of the sensors 16, 18, the user interface program 262 terminates the procedure. The foregoing functionality is ensured by the decisional flow chart block 321. The procedure requires display of the current sensor calibration value, as noted at a flow chart block 322. The user interface program 262 will wait until a key is received from the user. If a key "1" is received from the user, then a new calibration value may be entered, provided that it falls within a predefined valid range. Afterward, the user interface program 262 increments to the next sensor number, as noted at a flow chart block 327. However, if a key "2" is entered by the user, then the user interface program 262 immediately increments to the next sensor number, as indicated in flow chart blocks 326, 327. If neither key "1" or key "2" is entered by the user, then the procedure terminates.

Figure 18:
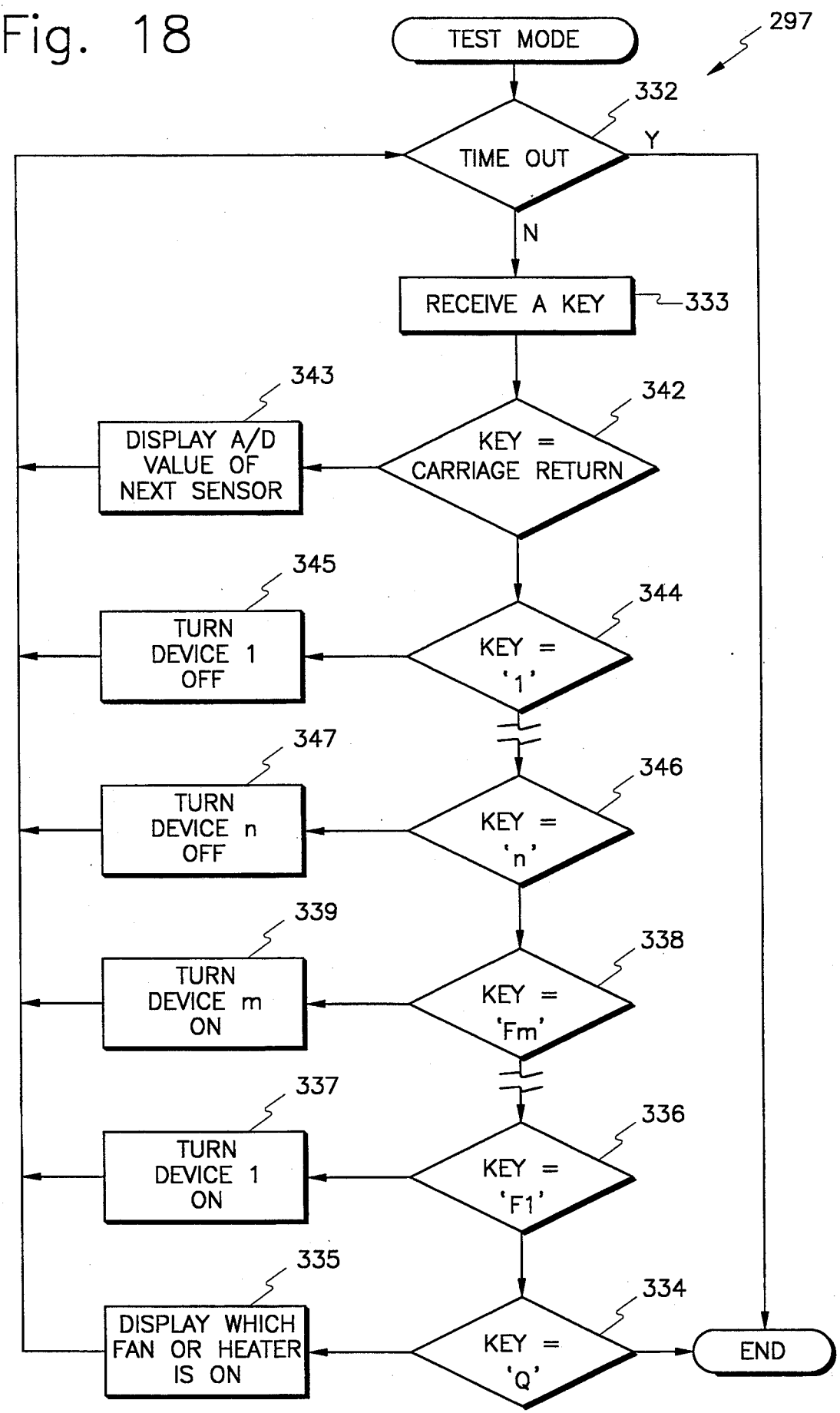
FIG. 18 is a flow chart illustrating a subroutine performed in a test mode step of the user interface program of FIG. 13.

The test mode performed by the user interface program 262 as indicated in the flow chart block 297 of FIG. 14B is illustrated in more detail in FIG. 18. Referring to FIG. 18, the test mode permits the user to selectively turn off and turn on each of the fans 22 and each of the heaters 24. In the preferred embodiment, function keys F1 through Fm are allocated for turning on one of the devices (i.e. a fan 22 or a heater 24). This functionality is indicated at flow chart blocks 336 through 339. Moreover, key "q" is allocated for displaying which fan or heater is in an active state. See flow chart blocks 334, 335. Furthermore, keys 1 through n respectively are allocated to turning off devices 1 through m.

It will be obvious to those skilled in the art that many variations and modifications will be made to the above-described preferred embodiment without substantially departing from the spirit and scope of the present invention. Accordingly, all such variations and modifications are intended to be included herein within the scope of the present invention as set forth in the following claims.

Wherefore, the following is claimed:

1. An environmental control system for accurately controlling the environment in an enclosure for poultry by insuring the integrity of sensed feedback signals representative of environmental conditions within the enclosure, comprising:
   at least three temperature sensors for sensing temperature within said enclosure and for generating temperature feedback signals indicative thereof;
   a control means for controlling the temperature within said enclosure in response to said temperature feedback signals;
   integrity check means associated with said control means, said integrity check means for insuring the accuracy of said temperature feedback signals, said integrity check means for eliminating a temperature feedback signal from consideration when a global temperature of said enclosure is determined if said temperature feedback signal falls outside a predefined range of the average of the other temperature feedback signals received from other temperature sensors.

2. The system of claim 1, wherein said integrity check means further comprises a means for eliminating said temperature feedback signal from consideration when said global temperature is determined, if said temperature feedback signal falls outside another predefined range on an absolute temperature scale.

3. The system of claim 1, wherein said integrity check means further comprises a means for indicating when said average cannot be determined.

4. The system of claim 1, wherein said predefined range is approximately twenty percent (20%).

5. The system of claim 1, further comprising:
   at least three humidity sensors for sensing humidity within said enclosure and for generating humidity feedback signals indicative thereof; and
   a humidity integrity check means associated with said control means, said humidity integrity check means for insuring the accuracy of said humidity feedback signals, said humidity integrity check means for eliminating a humidity feedback signal from consideration when a global humidity of said enclosure is determined if said humidity feedback signal falls outside a another predefined range of the average of the other humidity feedback signals received from other humidity sensors.

6. The system of claim 1, wherein said system is disposed within said enclosure and wherein said system is in communication with a host computer outside said enclosure.

7. The system of claim 1, further comprising a means for changing said predefined range.

8. The system of claim 1, wherein said system is disposed within said enclosure and wherein said system is in communication with a host computer outside said enclosure.

9. The system of claim 2, wherein said another predefined range is defined as approximately between fifty degrees (50°) and one hundred twenty degrees (120°) and wherein said temperature scale is the Fahrenheit temperature scale.

10. The system of claim 5, wherein said another predefined range is defined as approximately between zero percent (0%) and one hundred percent (100%) relative humidity.

11. The system of claim 5, further comprising a means for changing said another predefined range.

12. The system of claim 8, further comprising a means associated with said host computer for changing said predefined range.

13. An environmental control system for accurately controlling the environment in an enclosure for poultry by insuring the integrity of sensed feedback signals representative of environmental conditions within the enclosure, comprising:
   at least three humidity sensors for sensing humidity within said enclosure and for generating humidity feedback signals indicative thereof;
   a control means for controlling the humidity within said enclosure in response to said humidity feedback signals;
   integrity check means associated with said control means, said integrity check means for insuring the accuracy of said humidity feedback signals, said integrity check means for eliminating a humidity feedback signal from consideration when a global humidity of said enclosure is determined if said humidity feedback signal falls outside a predefined range of the average of the other humidity feedback signals received from other humidity sensors.

14. The system of claim 10, wherein said integrity check means further comprises a means for eliminating said humidity feedback signal from consideration when said global humidity is determined, if said humidity feedback signal falls outside another predefined range on an absolute humidity scale.

15. The system of claim 10, wherein said integrity check means further comprises a means for indicating when said average cannot be determined.

16. The system of claim 10, wherein said predefined range is approximately twenty percent (20%).

17. The system of claim 10, wherein said system is disposed within said enclosure and wherein said system is in communication with a host computer outside said enclosure.

18. The system of claim 10, further comprising a means for changing said predefined range.

19. The system of claim 14, wherein said another predefined range is defined as approximately between zero percent (0%) and one hundred percent (100%) relative humidity.

20. The system of claim 17, further comprising a means associated with said host computer for changing said predefined range.

21. A system for accurately controlling the environment in an enclosure for poultry by insuring the integrity of sensed feedback signals representative of environmental conditions within the enclosure, comprising:
   a heater disposed in said enclosure;
   at least three temperature sensors for sensing temperature within said enclosure and for generating temperature feedback signals indicative thereof;
   a fan for blowing air out of said enclosure;
   at least three humidity sensors for sensing humidity within said enclosure and for generating humidity feedback signals indicative thereof;
   a control means for controlling said heater and said fan in response to said temperature feedback signals and said humidity feedback signals;
   a temperature integrity check means for insuring the accuracy of said temperature feedback signals, said temperature integrity check means for eliminating a temperature feedback signal from consideration when a global temperature of said enclosure is determined if said temperature feedback signal falls outside a predefined range of the average of the other temperature feedback signals received from other temperature sensors; and
   a humidity integrity check means for insuring the accuracy of said humidity feedback signals, said humidity integrity check means for eliminating a humidity feedback signal from consideration when a global humidity of said enclosure is determined if said humidity feedback signal falls outside a predefined range of the average of the other humidity feedback signals received from other humidity sensors.

22. A method for accurately controlling the environment in an enclosure for poultry by insuring the integrity of sensed environment signals representative of the environmental conditions within the enclosure, comprising the steps of:
   (a) receiving said sensed environment signals from at least three sensors situated within said enclosure;
   (b) selecting an environment signal from said signals;
   (c) determining whether said signal is within a predefined range of the average of other signals received from other sensors;
   (d) if said signal falls outside said predefined range, eliminating said signal from consideration; and
   (e) determining a global environment measurement for said enclosure by mathematically combining said signals which are available for consideration.

23. The method of claim 22, further comprising the steps of:
   determining whether said signal is within another predefined range on an absolute scale; and
   if said signal falls outside said another predefined range, eliminating said signal from consideration.

24. The method of claim 22, wherein said environment signals are indicative of temperatures within said enclosure and wherein said global environment measurement is the global temperature within said enclosure.

25. The method of claim 22, wherein said environment signals are indicative of humidity within said enclosure and wherein said global environment measurement is the global relative humidity within said enclosure.

* * * * *